United States Patent [19]

Fujimura et al.

[11] Patent Number: 4,534,284

[45] Date of Patent: Aug. 13, 1985

[54] HIGH SPEED EGG BREAKING APPARATUS

[75] Inventors: Gen Fujimura; Koichi Sotoma, both of Tokyo; Hiroshi Kunikyo; Masahito Hata, both of Yokohama; Hidesuke Inoue, Tokyo, all of Japan

[73] Assignee: Kewpie Kabushiki Kaisha, Tokyo, Japan

[21] Appl. No.: 493,576

[22] Filed: May 11, 1983

Related U.S. Application Data

[63] Continuation-in-part of Ser. No. 486,487, Apr. 19, 1983, abandoned.

[30] Foreign Application Priority Data

| Apr. 21, 1982 | [JP] | Japan | 57-65251 |
| May 11, 1982 | [JP] | Japan | 57-78747 |
| Jun. 12, 1982 | [JP] | Japan | 57-100981 |
| Jun. 20, 1982 | [JP] | Japan | 57-110047 |
| Aug. 18, 1982 | [JP] | Japan | 57-124087 |

[51] Int. Cl.³ .......................... A23J 1/09; A47J 43/14
[52] U.S. Cl. .............................................. 99/498; 99/500
[58] Field of Search ........................... 99/495–500, 99/568, 577, 578, 581, 582; 426/490, 614, 478–480; 198/384, 387, 484, 576

[56] References Cited

U.S. PATENT DOCUMENTS

| 2,760,536 | 8/1956 | Willsey | 99/498 |
| 3,455,356 | 7/1969 | Classen | 99/498 |
| 3,480,056 | 11/1969 | Willsey | 99/498 |
| 3,857,472 | 12/1974 | Klint | 198/384 |
| 4,111,111 | 9/1978 | Willsey | 99/499 |
| 4,137,838 | 2/1979 | Warren | 99/500 |
| 4,167,138 | 9/1979 | Warren | 99/498 |
| 4,321,864 | 3/1982 | Willsey | 99/500 |

Primary Examiner—Timothy F. Simone
Attorney, Agent, or Firm—Oblon, Fisher, Spivak, McClelland & Maier

[57] ABSTRACT

A multiplicity of shell eggs to be broken are first transported in transverse rows on an infeed conveyor, from which they are loaded onto a transfer conveyor. This transfer conveyor extends at a right angle to the infeed conveyor, so that the successive transverse rows of shell eggs on the infeed conveyor are rearranged into a longitudinal row on the transfer conveyor. The shell eggs are subsequently transferred from the transfer conveyor onto respective egg breaker assemblies mounted at longitudinal spacings on an endless breaker conveyor, while the breaker assemblies are traveling side by side with the transfer conveyor. The breaker assemblies break the shell eggs, and the white and yolk recovered therefrom are separated by recovery cup assemblies also carried by the breaker conveyor under the respective breaker assemblies. As an incidental feature, an air nozzle assembly is mounted on the breaker conveyor in the vicinity of each breaker assembly. Supplied with pressurized air from an air supply mechanism on one of the rotary wheels around which the breaker conveyor extends, each air nozzle assembly applies forced streams of air into a broken eggshell on one of the breaker assemblies for the recovery of the residual liquid therefrom.

18 Claims, 24 Drawing Figures

HIGH SPEED EGG BREAKING APPARATUS

This application is a continuation-in-part of application Ser. No. 486,487 filed Apr. 19, 1983 now abandoned.

BACKGROUND OF THE INVENTION

This invention relates to egg processing in general and, in particular, to a method of, and apparatus for, breaking shell eggs at a high rate on an industrial scale.

Industrially, most eggs to be converted to egg products are broken by high speed mechanical breakers. These machines separate the yolk and albumen, the latter being more commonly known as the white. As heretofore constructed, the egg breakers have had several drawbacks limiting their production rates.

One of the drawbacks arises in connection with the feeding of shell eggs into the breaker. A typical conventional feeding scheme has been such that shell eggs to be broken are first washed on an infeed conveyor, from which they are loaded directly on respective egg breaker assemblies mounted at longitudinal spacings on a looped conveyor of the breaker. A difficulty has been encountered in thus loading the eggs on the breaker assemblies in the correct attitude. Unless loaded correctly, the eggs cannot be cut and severed in the middle portion of each egg by the breaker assemblies, making difficult the thorough recovery of the white and yolk therefrom. The higher the rate is made at which eggs are loaded on the breaker assemblies from the infeed conveyor, the more improperly are they positioned on the breaker assemblies. Thus the conventional feeding practice has been a bottleneck in the high speed processing of eggs.

Another problem is the incomplete recovery of egg contents. Generally, in egg breakers of the type under consideration, shell eggs are held recumbently by the respective breaker assemblies. Each breaker assembly has a pair of knives movable toward and away from each other. Held against each other, the pair of breaker knives cut into a shell egg at its midpoint from below and then move apart to separate the shell into two pieces, thereby causing the white and yolk to drop into a recovery cup assembly. All the shell eggs are not necessarily broken in the intended manner, however, as some of them may be held by the breaker assemblies in other than the correct recumbent attitude. Part of the white or even the yolk may remain in the broken shells. Such residues have heretofore been discarded with the shells.

An obvious solution to this problem is to apply forced streams of air into the broken eggshells while they are still being carried by the breaker assemblies. The residual liquid will be blown out of the shells for recovery in the underlying recovery cup assemblies. This solution is not so easy to practice as it may seem, however, for the following reasons.

The egg breaker assemblies are mounted as aforesaid on the looped breaker conveyor. While traveling at constant speed along the looped path, the breaker assemblies receive shell eggs from the infeed conveyor, break them, and have their shells unloaded. The recovery of the residual liquid from the broken shells must be performed on the traveling breaker assemblies at some stage between the breaking of the shell eggs and the unloading of the broken shells. It is uneconomical, or rather totally impractical, to mount sources of pressurized air on the breaker conveyor for the respective breaker assemblies. Perhaps the only practical scheme is to provide air nozzles on the breaker conveyor for the respective breaker assemblies and to supply pressurized air to the nozzles while the breaker assemblies are traveling through a predetermined region along the breaker conveyor path. A difficulty arises, however, in such controlled supply of pressurized air to the traveling nozzles from a fixed source. A rotary valve would do if the nozzles revolved about a single axis. The breaker conveyor turns around several sprockets or like wheels and so inhibits the use of a simple rotary valve. No satisfactory alternative has so far been suggested, so that the pneumatic recovery of the residues from broken eggshells has just been a paper plan.

The known high speed egg breakers have also had difficulties with regard to the recovery cup assemblies designed to separate the white and yolk. Each recovery cup assembly comprises a yolk cup just under one of the egg breaker assemblies on the breaker conveyor, and an albumen cup underlying the yolk cup. The yolk cup receives both white and yolk from the broken egg and allows the white to flow out of a recess cut in its side wall.

In the yolk cup of prior art design, the recess has not been well adapted for the complete outflow of the white, often allowing part of the white, particularly the dense albumen, to remain in the yolk cup along with the yolk. It is also a disadvantage that the recess has been so positioned on the yolk cup that the recovered yolk is discharged therefrom through the recess. The yolk on flowing through the recess has been easy to have its enclosing membrane broken and thus to smear the cup, necessitating its cleaning. Of course the yolk cup remains unsmeared if the yolk is discharged intact.

Furthermore, the conveyor for transferring the eggs in the conventional apparatus has a plurality of pairs of convex rolls parallel to each other on which each egg is supported and transferred to the successive process.

However, in such a pair of convex rolls, if the eggs are extremely large, they cannot be supported stably on the rolls and sometimes they fall down from the rolls because the size of the rolls is fixed or unchangeable.

SUMMARY OF THE INVENTION

Generally, the invention has been made with a view to drastically increasing the production rates of egg breakers of the type defined. More specifically, for the attainment of this general objective, the invention seeks to make possible the feeding of shell eggs into the machine at a far higher rate than hitherto. Further, the invention aims at the complete recovery of the liquid contents of eggs, particularly by realizing the pneumatic, forced removal of the residual liquid from within the broken eggshells. The invention also seeks to efficiently and thoroughly separate the recovered white and yolk without rupturing the enveloping membrane of the latter.

According to one aspect of the invention there is provided a high speed egg breaking method such that a multiplicity of shell eggs to be broken are transported in transverse rows on an infeed conveyor. Each transverse row of shell eggs are transferred at one time from the infeed conveyor onto a transfer conveyor laid at a right angle therewith. Thus the successive transverse rows of shell eggs on the infeed conveyor are rearranged into a longitudinal row on the transfer conveyor. This single row of shell eggs on the transfer conveyor are again transferred therefrom onto respective egg breaker assemblies being carried by a breaker conveyor while the latter is running side by side with the transfer conveyor. Then the shell eggs are broken by the breaker assemblies for the recovery of the white and yolk therefrom, and the broken shells are subsequently removed from the breaker assemblies.

The invention also provides, according to another aspect thereof, apparatus comprising the above recited infeed conveyor, transfer conveyor, and breaker conveyor with the egg breaker assemblies thereon. Also, included are recovery cup assemblies carried by the breaker conveyor just under the respective egg breaker assemblies for receiving the white and yolk from the broken eggs.

Preferably the transfer conveyor has pairs of concave rolls mounted thereon at longitudinal spacings equal to the spacings between the egg breaker assemblies on the breaker conveyor. Receiving shell eggs from the infeed conveyor, the pairs of concave rolls are adapted to rearrange them into the correct recumbent attitude preparatory to unloading them onto the egg breaker assemblies. This transfer of the shell eggs from concave roll pairs to breaker assemblies is carried out while the transfer conveyor and the breaker conveyor are traveling in the same direction at the same speed. Consequently the shell eggs can be placed on the breaker assemblies with their recumbent attitude unchanged. The correct mounting of the eggs on the breaker assemblies is a requirement for the proper breaking thereof by the breaker assemblies. Thus the method and apparatus of this invention are well adapted for the high speed processing of eggs.

The method and apparatus of the invention may comprise an additional step of or means for, pneumatically recovering the residual liquid from within the broken eggshells being carried by the breaker assemblies on the breaker conveyor. The pneumatic residue recovery means comprise air nozzle assemblies operatively mounted on the breaker conveyor in the vicinities of the respective egg breaker assemblies thereon, and an air supply mechanism for the delivery of pressurized air to the air nozzle assemblies. The air supply mechanism is built into one of the rotary wheels around which the breaker conveyor extends. While traveling around this rotary wheel, the successive air nozzle assemblies are supplied with pressurized air from the air supply mechanism and expel the air out into the broken eggshells carried by the corresponding breaker assemblies thereby causing the residual liquid to drop into the underlying recovery cup assemblies. Thus the invention realizes the pneumatic residue recovery scheme with use of compact, economical means.

Each air nozzle assembly includes an air nozzle movable between a retracted and a working position. Possibly the egg breaker assemblies may fail to break the shell eggs thereon. In that case the air nozzle would thrust into the unbroken shell egg on its movement to the working position. This possibility is avoided in accordance with the invention by providing a spring through which the air nozzle is moved from the retracted position to the working position. The spring yields when the air nozzle moves into abutment against the unbroken shell egg.

The invention also features the improved construction of a yolk cup forming a part of each recovery cup assembly. Receiving both white and yolk from a broken egg on the overlying one of the egg breaker assemblies, the yolk cup causes only the white to flow out of the same and the yolk to remain therein. For the outflow of the white, the yolk cup has formed therein a recess extending downwardly from its top edge and terminating short of its bottom, and a slot extending at least in one circumferential direction from the lower end of the recess. The recess and slot are designed to assure ready outflow of the bodies of fluid and dense albumen contained in each egg.

The above and other features and advantages of this invention and the manner of attaining them will become more apparent, and the invention itself will best be understood, from a study of the following description and appended claims taken together with the attached drawings.

DETAILED DESCRIPTION OF THE INVENTION

Figure 1:
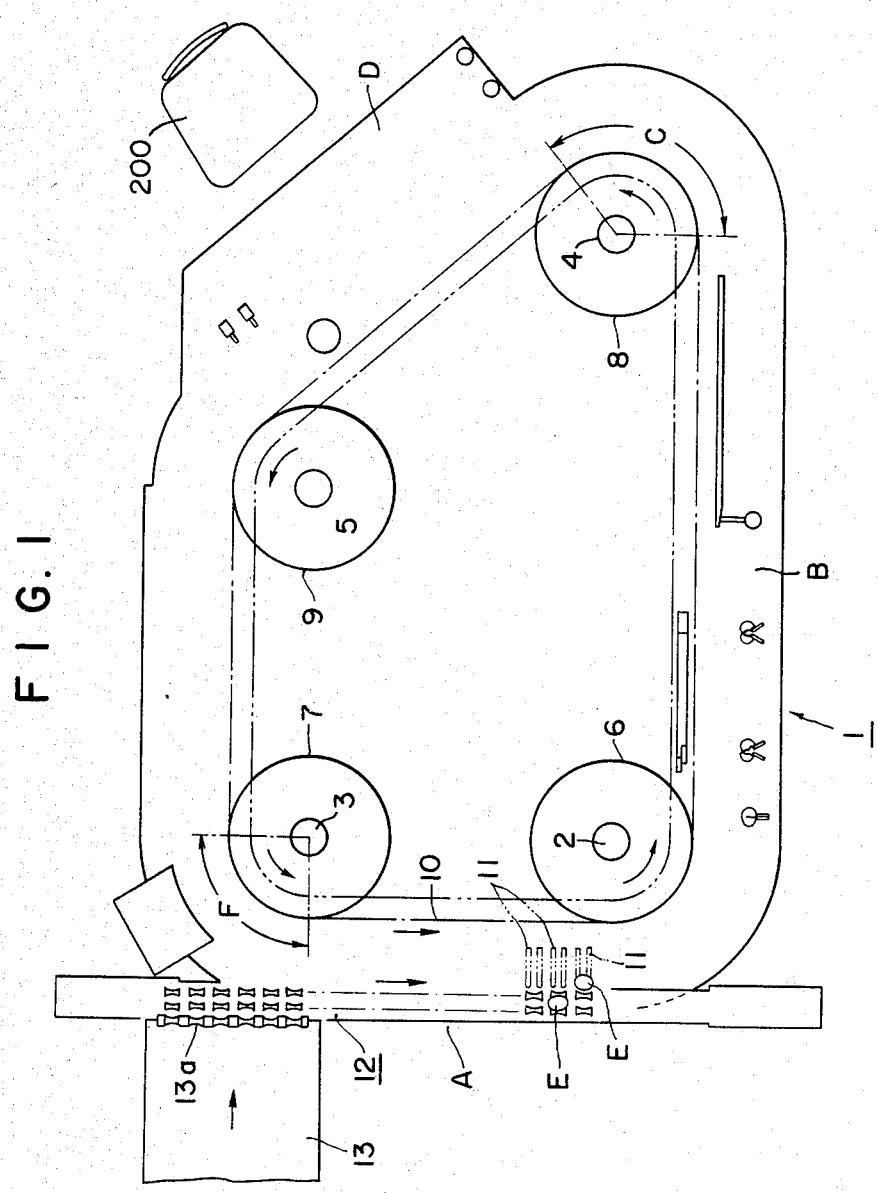
FIG. 1 is a schematic plan of the high speed egg breaker constructed in accordance with this invention.

The general organization of the exemplified high speed egg breaker in accordance with the invention will become apparent from a consideration of FIG. 1. Generally designated 1, the egg breaker comprises a conveyor 10 extending horizontally around a plurality of, four in this embodiment, rotary wheels 6, 7, 8 and 9 on respective upstanding shafts 2, 3, 4 and 5. The conveyor 10 is composed of a pair of vertically spaced endless chains, as will be later explained in further detail, and will hereinafter be referred to as the breaker conveyor in contradistinction to other conveyors to be described subsequently. The breaker conveyor 10 carries a plurality, or multiplicity, of egg breaker assemblies 11 on its outer side at prescribed longitudinal spacings.

Of the four rotary wheels supporting the breaker conveyor 10, the wheel 6 is a sprocket wheel making positive engagement with the conveyor chains. The other wheels 7, 8 and 9 are all idlers serving to guide the conveyor chains.

It will be observed that the breaker conveyor 10 turns right angularly around the sprocket wheel 6 and the idler wheel 7 which are considered to lie on the front side of the egg breaker 1. While the idler wheel 9 is spaced from the idler wheel 7 to the same extent as the spacing between the sprocket 6 and idler 7 wheels, the idler wheel 8 is distanced from the sprocket wheel 6 significantly more than the spacing between the wheels 6 and 7 and between the wheels 7 and 9. Consequently the breaker conveyor 10 turns acutely around the idler wheel 8 and obtusely around the idler wheel 9.

The trapezoid path of the breaker conveyor 10 around the four wheels 6 to 9 arranged as above is divided into several regions for the performance of different egg-processing functions. They are:

1. A loading region A, extending linearly from the idler wheel 7 to the sprocket wheel 6, where shell eggs E are loaded on the individual breaker assemblies 11 from an infeed conveyor 13 via a transfer conveyor 12.

2. A recovery region B, extending linearly from the sprocket wheel 6 to the idler wheel 8 and thus shell eggs E are broken and their yolk and white are recovered.

3. A residue removal region C, extending arcuately around the idler wheel 8, where the residual liquid in the broken eggs are pneumatically removed therefrom and recovered.

4. An inspection region D, extending linearly from the idler wheel 8 to the idler wheel 9, where the recovered egg contents are visually examined by a human inspector sitting on a chair 200.

5. A discharge region F, extending arcuately around the idler wheel 7, where the broken egg shells as well as unbroken shell eggs, if any, are unloaded from the breaker assemblies 11 and discharged.

Disposed alongs.de the loading region A, the transfer conveyor 12 performs the important function of efficiently loading shell eggs E on the breaker assemblies 11 on the breaker conveyor 10. The transfer conveyor 12 receives the eggs to be loaded from the infeed conveyor 13. Arranged at right angles with respect to the transfer conveyor 12, the infeed conveyor 13 terminates at the upstream end of the transfer conveyor. The infeed conveyor 13 comprises a multiplicity of transverse rows of concave rolls 13a for holding shell eggs thereon. Although FIG. 1 shows only one transverse row of concave rolls 13a for simplicity, it will be understood that the infeed conveyor 13 can support six shell eggs in each transverse row in this particular embodiment.

Figure 2:
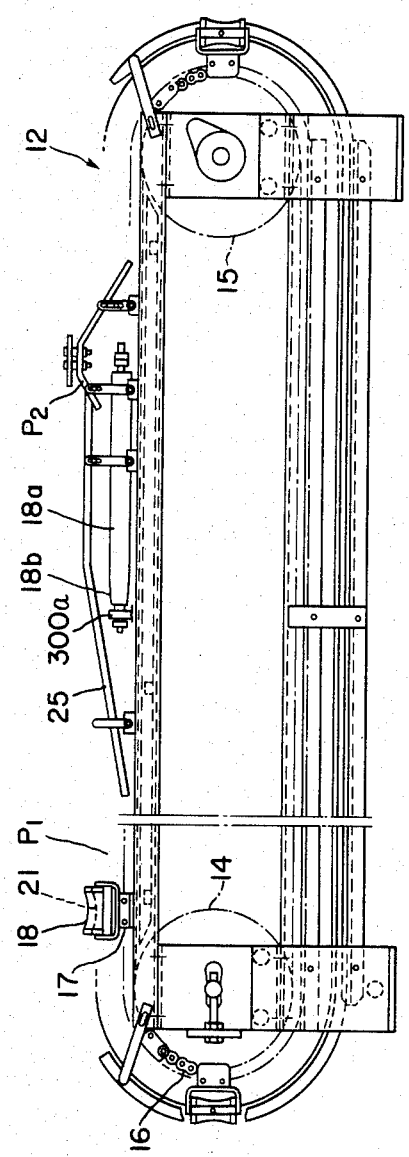
FIG. 2 is an enlarged side elevation, with parts omitted and parts shown broken away for illustrative convenience, of the transfer conveyor in the egg breaker of FIG. 1.

As illustrated in greater detail and on an enlarged scale in FIG. 2, the transfer conveyor 12 has an endless chain 16 extending around two sprocket wheels 14 and 15 rotatable about horizontal axes. Mounted on the endless chain 16 via respective clevises 17 are a multiplicity of concave rolls 18 having longitudinal spacings equal to the spacings between each transverse row of shell eggs on the infeed conveyor 13.

Figure 3:
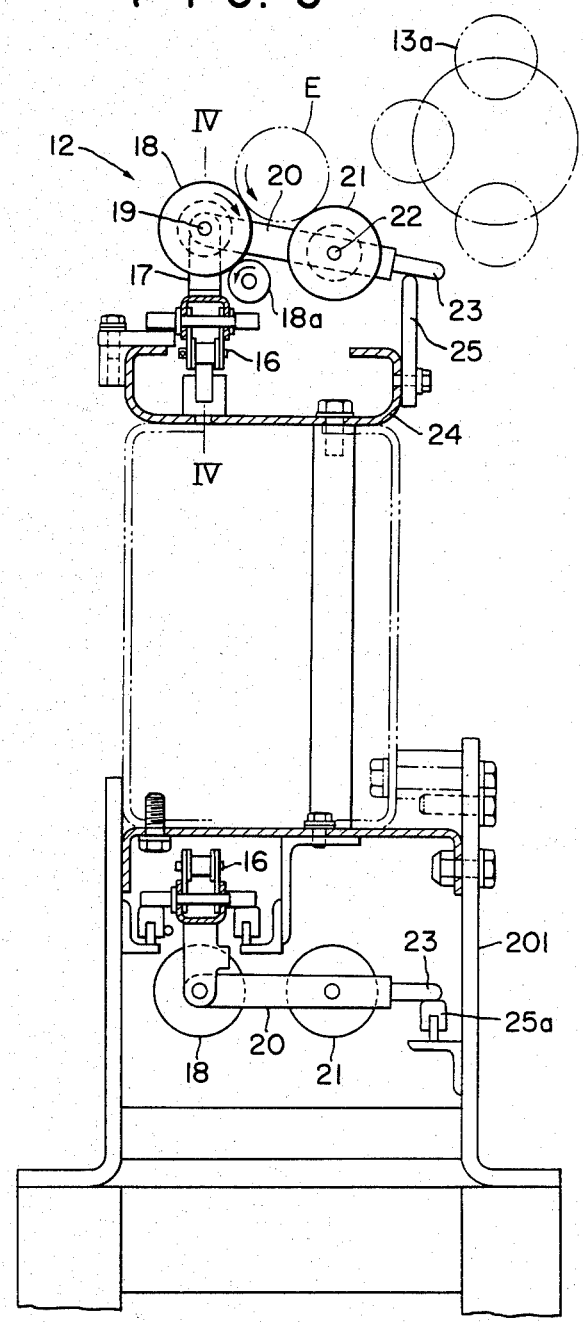
FIG. 3 is a still more enlarged cross section through the transfer conveyor of FIG. 2.
Figure 4:
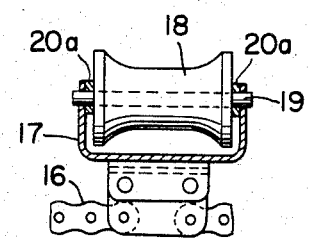
FIG. 4 is a fragmentary section through the transfer conveyor, taken along the line IV—IV of FIG. 3.

As shown on a still more enlarged scale in FIGS. 3 and 4, each concave roll 18 of the transfer conveyor 12 is rotatable about a pin 19 extending parallel to the upper and lower moving parts of the endless chain 16 and having its opposite ends supported by the clevis 17. A drive roll 18a seen in FIG. 3 makes frictional contact with each concave roll 18 for imparting rotation thereto in the clockwise direction as viewed in this figure. The drive means associated with the drive rolls 18a are not shown because of their conventional nature.

A U-shaped support 20 has its pair of parallel limbs 20a pivotally mounted on the pin 19 of each concave roll 18. Rotatably supported between these limbs of the U-shaped support, via a pin 22, is another concave roll 21 which is similar in shape and size to the first recited concave roll 18. These two concave rolls 18 and 21, rotatable about parallel axes, make up a pair for conjointly holding a single shell egg E thereon in a recumbent attitude. The drive rolls 18a are provided adjacent to a position where the eggs on the infeed conveyor 13 are transported to the transfer conveyor 12 so that each egg on the rolls 18 and 21 is moved to a stable position between the pair of rolls 18 and 21 due to rotation of the rolls 18. Both concave rolls should preferably be molded from plastics or other similarly pliant materials, and should be hollow, for the application of minimum shocks to the shell eggs as they are loaded thereon, transported thereby, and unloaded therefrom.

One of the sprocket wheels 14 and 15 of the transfer conveyor 12 is coupled to a drive mechanism, not shown, for driving the endless chain 16. It is essehtial that the upper moving part of the transfer conveyor chain 16 runs in the same direction, and at the same speed, as the breaker conveyor 10 as it traverses the loading region A of FIG. 1. The reason for this will become apparent as the description progresses.

Figure 5:
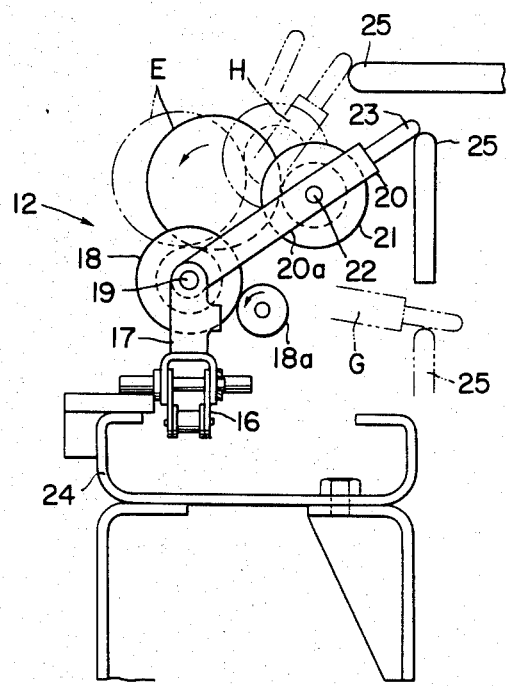
FIG. 5 is a fragmentary cross section through the transfer conveyor, somewhat similar to FIG. 3 but drawn on a further more enlarged scale, explanatory of its operation.

Projecting from the free end of the pivoted support 20 carrying the concave roll 21 is a cam follower pin 23 resting by gravity on a cam rail 25 secured to and extending along a guide 24 of the transfer conveyor chain 16. The cam rail 25 is contoured to cause the pivotal motion of the support 20 about the pin 19 and, in consequence, the up-and-down motion of the concave roll 21 in relation to the associated concave roll 18. The cam follower pin 23 slides on a guide rail 25a fixed to a frame 201 when it moves along the lower moving part of the transfer conveyor chain 16. FIG. 5 better illustrates such pivotal motion of the support 20. In a position opposite to the unloading end of the infeed conveyor 13, FIG. 1, the cam rail 25 lowers the support 20 to a position G to allow smooth loading of a shell egg E on each pair of concave rolls 18 and 21. As the concave roll pair subsequently travels through the loading region A and reaches midway between its opposite extremities, the cam rail 25 starts lifting the support 20 past its horizontal position until finally the support assumes the position H of FIG. 5 for the unloading of the egg from over the concave roll pair onto one of the egg breaker assemblies 11 on the breaker conveyor 10. It will be noted from FIG. 5 that the cam rail 25 is held sidewise against each cam follower pin 23 in the vicinity of its most elevated position.

Figure 6:
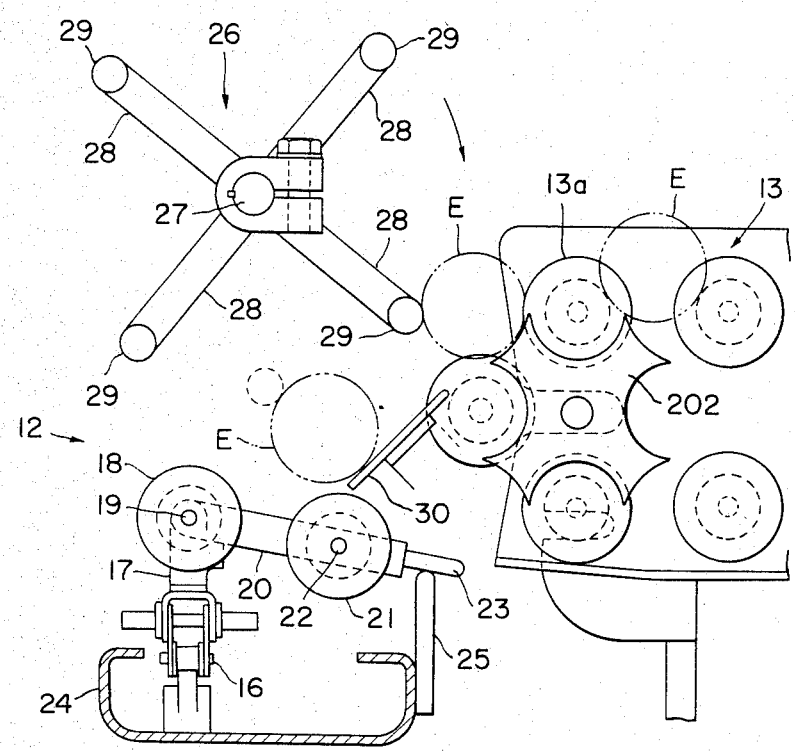
FIG. 6 is also a fragmentary cross section through the transfer conveyor, shown together with the infeed conveyor and a loader in order to illustrate the way in which shell eggs are transferred from infeed conveyor to transfer conveyor with the aid of the loader.

With reference to FIG. 6, a loader 26 is disposed over the loading end of the transfer conveyor 12 for the controlled loading of the successive groups of shell eggs E from the infeed conveyor 13 to the transfer conveyor 12. The loader 26 comprises a plurality of, four in this embodiment, support arms 28 mounted radially on a horizontal shaft 27, and loading arms 29 extending right-angularly from the outer ends of the support arms 28. Extending horizontally across the unloading end of the infeed conveyor 13, each loading arm 29 is revolved into abutment against one transverse row of shell eggs E being unloaded from the infeed conveyor 13. Then the loading arm guides the group of shell eggs along a chute 30 onto the respective pairs of concave rolls 18 and 21 of the transfer conveyor 12. The infeed conveyor 13 is moved intermittently by a star wheel 202 engaging with each roll 13a.

The aforesaid egg breaker assemblies 11 are mounted on the breaker conveyor 10 at spacings equal to the spacings between the pairs of concave rolls 18 and 21 on the transfer conveyor 12.

Figure 7:
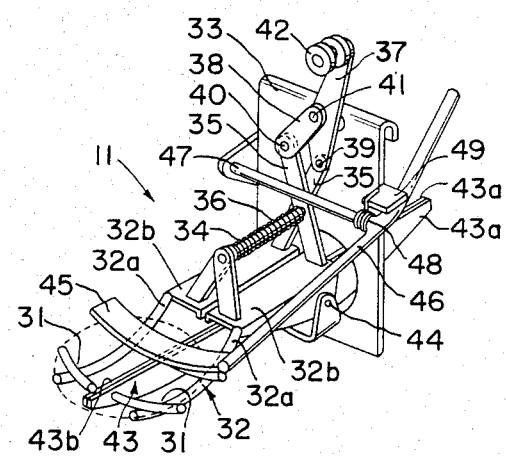
FIG. 7 is an enlarged perspective view of one of the egg breaker assemblies in the egg breaker of FIG. 1.

FIG. 7 is a detailed representation of each egg breaker assembly 11. It includes an egg holder 32 adapted to provide a splittable egg rest 31 on which a shell egg is to be placed recumbently. The egg holder 32 has a pair of approximately parallel arms 32a. At their ends away from the egg rest 31, these parallel arms 32a are respectively secured to the lower ends of a pair of crossing levers 35 via two plates 32b. The levers 35 are pivotally mounted on an upstanding mounting bracket 33 via a pin 34 passing through their crossing point. Thus the pair of arms 32a are movable toward and away from each other. Sleeved upon the pin 34, a torsion spring 36 normally holds the arms 32a against each other.

At their upper ends the pair of crossing levers 35 are pin jointed at 39 and 40 to respective links 37 and 38. The link 38 is pin jointed at 41 to the other link 37 in its intermediate position. The link 37 carries a cam follower roll 42 on its end away from the pin 39. The cam follower roll 42 is in engagement with cam means, not shown, thereby to be moved up and down with the travel of the egg breaker assembly 11 on the breaker conveyor 11. It will be seen that the levers 35 and links 37 and 38 constitute in combination a four-bar linkage acting to cause the movement of the pair of holder arms 32a toward and away from each other with the up-and-down motion of the cam follower roll 42. The holder arms 32a are held separated from each other as the pivot pin 41 joining the links 37 and 38 moves downwardly past the line connecting the pivot pins 39 and 40 with the descent of the cam follower roll 42.

Pivotally attached at 44 to respective holder arms 32a are a pair of egg breaker knives 43a which are movable with the holder arms 32a toward and away from each other, besides being pivotable about the axis 44. When the holder arms 32a are held against each other, so are the breaker knives 43a, coacting to cut into a shell egg on the egg rest 31. The reference numeral 43 denotes a breaker knife assembly comprising the pair of separable knives 43a. The breaker knife assembly has a blade portion 43b movable up and down through the egg rest 31.

Each egg breaker assembly 11 further comprises an egg retainer 45 carried by a retainer lever 46 having a pivot 47 mounted on the bracket 33. The retainer lever 46 is also operated by unshown cam means, arranged along the breaker conveyor 10 of FIG. 1, for pivotal motion about the pivot 47. Wound around the pivot 47, a torsion spring 48 biases the retainer 45 downwardly toward the egg rest 31. A stop 49 on the bracket 33 determines the lower limit of the retainer 45 where it can firmly hold a shell egg against the rest 31.

After being washed, shell eggs E to be processed by the apparatus of FIG. 1 are placed on the infeed conveyor 13 and thereby transported to the loading end of the transfer conveyor 12. As each transverse row of shell eggs reach the unloading end of the infeed conveyor 13, one of the loading arms 29 of the loader 26 holds the eggs from below with the rotation of the shaft 27 in the arrow marked direction, as illustrated in FIG. 6. Then the loading arm 29 guides the row of shell eggs downwardly along the chute 30 and onto the respective pairs of concave rolls 18 and 21 of the transfer conveyor 12.

In this loading position of the transfer conveyor 12, the cam rail 25 holds the concave rolls 21 lower than the other concave rolls 18, as best seen in FIG. 6. Each pair of rolls 18 and 21 are thus directed toward the infeed conveyor 13. Accordingly the shell eggs E can be smoothly transferred from the infeed conveyor to the transfer conveyor via the chute 30 with the aid of the loader 26. It will of course be understood that each transverse row of shell eggs on the infeed conveyor 13 are loaded at one time on the transfer conveyor.

Once loaded on the transfer conveyor 12, the shell eggs can seat stably on the respective pairs of rolls 18 and 21 by virtue of their concave shape. As has been stated, the drive rolls 18a of FIG. 3 frictionally rotate the concave rolls 18 as the transfer conveyor 12 transports the loaded shell eggs through the loading region A. This rotation of the concave rolls 18, combined with the vibrations of the transfer conveyor caused by the endless chain 16 running over the sprocket wheels 14 and 15, gradually causes the shell eggs to assume a recumbent attitude on the respective pairs of rolls 18 and 21.

As the shell eggs travel along the loading region A as above, the cam rail 25 gradually lifts the supports 20 carrying the concave rolls 21, causing these rolls to rise higher than the other concave rolls 18. Finally, when the concave rolls 21 reach the most elevated position H of FIG. 5, the shell eggs E roll under their own weight from over the pairs of concave rolls 18 and 21 onto the rests 31 of the corresponding breaker assemblies 11. The pairs of concave rolls 18 and 21 on the transfer conveyor 12 and the egg breaker assemblies 11 on the breaker conveyor 10 travel side by side and at the same speed in the loading region A. Further the concave roll pairs and the egg breaker assemblies are at the same longitudinal spacings and in transverse alignment. Consequently the shell eggs E can be unfailingly transferred from concave roll pairs to breaker assemblies, there being no relative motion therebetween.

It should be appreciated that the positions of the shell eggs on the concave roll pairs of the transfer conveyor 12 have been readjusted both by the mechanical vibrations of the conveyor and by the forced rotation of the concave rolls 18. All the shell eggs can thus be reloaded in the same recumbent attitude on the breaker assemblies. This attitude of the shell eggs remains unchanged on the breaker assemblies because there is no difference in the traveling speed of the concave roll pairs and the breaker assemblies as the eggs are transferred from the former to the latter. The correct attitude of the shell eggs on the breaker assemblies makes possible the proper breaking thereof in the manner to be set forth subsequently. It will therefore be understood that the egg breaker of this invention is well equipped to process eggs efficiently no matter how high the rate may be at which the eggs are fed into the machine.

It is understood that the egg retainers 45 of the breaker assemblies 11 have been raised while the shell eggs are being loaded thereon in the loading region A. After the loading of the eggs on the breaker assemblies, the retainer levers 46 are cam operated by engagement of the rear end of each lever 46 and a guide rail (not shown) to cause the descent of the retainers 45 onto the loaded eggs. The lowered retainers immovably hold the eggs against the rests 31.

Immediately after the shell eggs have been clamped as above on the breaker assemblies 11, that is, after the breaker assemblies have turned around the sprocket wheel 6 into the recovery region B of FIG. 1, the breaker knife assembly 43 of each breaker assembly is cam-operated by engagement of the rear ends of the knives 43a and a guide rail 204 (FIG. 16) to cause its blade portion 43b to be pivoted upwardly, through the gap between the pair of holder arms 32a, to cut into the shell egg being caught on the rest 31 by the retainer 45. Then the cam follower 42 of each breaker assembly 11 is lowered by the unshown cam means until the pivot pin 41 joining the links 37 and 38 of the four-bar linkage comes below the line between the pivot pins 39 and 40. The result is the movement of the pair of holder arms 32a away from each other. Thus the shell egg is broken and torn apart. While the broken egg shell is still caught between holder arms 32a and retainer 45, its contents drop into a recovery cup assembly which is supported by the breaker conveyor 10 just under each breaker assembly 11.

The details of the recovery cup assemblies are yet to be studied. For the moment, therefore, suffice it to say that each recovery cup assembly has provisions for separating the white and yolk of each egg as they drop from the overlying breaker assembly.

The breaking of the successive shell eggs and the recovery of the white and yolk therefrom take place as aforesaid in the recovery region B of the breaker conveyor 10. The egg contents may not be wholly recovered from the broken shells in the recovery region B, however. In consideration of this possibility, the invention suggests the provision of means for pneumatically removing the residual contents of the successive broken eggs from within the shells while they are traveling through the residue removal region C around the idler wheel 8. The pneumatically removed residues are also to drop into the recovery cup assemblies. The pneumatic residue removal means will be shown and described subsequently in further detail.

In the succeeding inspection region D between the idler wheels 8 and 9 of the breaker conveyor 10, a human inspector visually inspects the recovered egg white and yolk in the recovery cup assemblies. If he finds that the recovered egg white and yolk are in an undesirable state, for example, where a piece of broken shell is mixed therein, he can tilt the cup assembly to discharge them before a recovery position for the white and yolk which is located between the regions D and F. Finally, in the discharge region F around the idler wheel 7, the broken shells as well as unbroken shell eggs, if any, are removed from the breaker assemblies 11 and discharged from the machine by any known or suitable means. Thus unloaded, the breaker assemblies subsequently reenter the loading region A. The foregoing cycle of operation is repeated thereafter.

Figure 8:
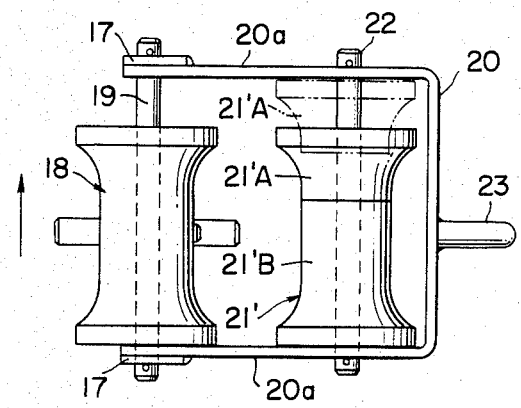
FIG. 8 is a top plan of a modified pair of concave rolls for use on the transfer conveyor in the egg breaker of FIG. 1.
Figure 9:
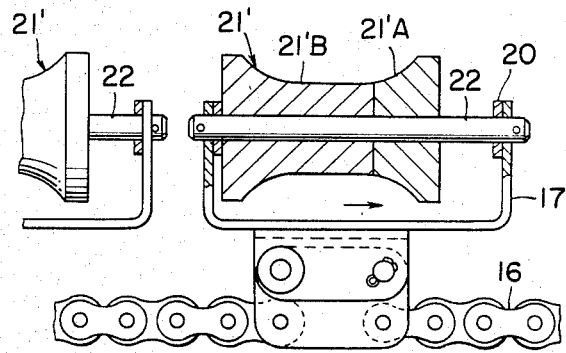
FIG. 9 is a fragmentary side elevation, partly sectioned for clarity, of the transfer conveyor incorporating the modified pairs of concave rolls of FIG. 8.
Figure 10:
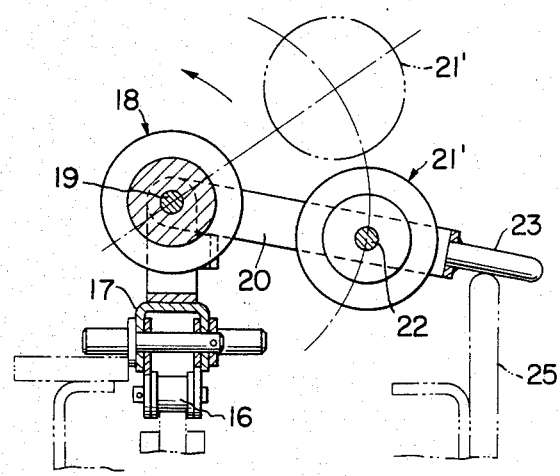
FIG. 10 is a fragmentary cross section through the transfer conveyor of FIG. 9, the view being explanatory of its operation.

FIGS. 8 to 10 show a slight modification of the pairs of concave rolls on the transfer conveyor 12 best shown in FIG. 2. The modification resides in a concave roll 21' of each pair, which is transversely split into two segments 21'A and 21'B of different axial lengths, whereas the other concave roll of each roll pair remains unaltered and so is designated by the same reference numeral 18 as in FIGS. 2 to 6.

Also as in FIGS. 2 to 6 each concave roll 18 is rotatably mounted on the pin 19 supported by the clevis 17 on the endless chain 16 of the transfer conveyor 12. The split concave roll 21' associated with each concave roll is rotatably mounted on the pin 22 extending between the parallel limbs 20a of the U-shaped support 20 pivoted on the pin 19. Projecting from the free end of the pivotal support 20, the cam follower pin 23 rests on the cam rail 25 to cause the up-and-down motion of the split concave roll 21', as has been explained in the foregoing.

As will be noted upon inspection of FIGS. 8 and 9, however, the distance between the parallel limbs 20a of the U-shaped support 20 in relation to the axial dimension of the concave rolls 18 and 21' is made longer than in the preceding embodiment. The pair of concave rolls 18 and 21' are both slidable axially on the pins 19 and 22 within the limits determined by the parallel limbs of the U-shaped support.

Basically the concave roll 21' may be split along a transverse plane anywhere between its ends. Preferably, however, the segment 21'A disposed forwardly with respect to the arrow marked traveling direction of the transfer conveyor should have an axial length approximately one third the total length of the concave roll.

Before the loading of a shell egg, each pair of concave rolls 18 and 21' is held by inertia against the rear one of the parallel limbs 20a of the U-shaped support 20 with respect to the traveling direction of the transfer conveyor 12. The pair of concave rolls receive a shell egg from the infeed conveyor 13 in these positions relative to the U-shaped support, with the roll 21' held lower than the other 18 by the cam rail 25, as indicated by the solid lies in FIG. 10. While being loaded, the shell egg first rides on the split roll 21' lying closer to the infeed conveyor 13. If the egg is of above-average size, it will push the segment 21'A of the concave roll 21' away from the other segment 21'B toward the phantom position of FIG. 8. Thus the split roll 21' will accommodate itself to the size of the egg being loaded.

As the U-shaped support 20 subsequently gains a horizontal position to hold the two concave rolls 18 and 21' thereon the same level, the loaded egg will exert a part of its weight on the other, unsplit roll 18 thereby causing the same to slide along the pin 19 to a position suiting the particular size of the egg. Then the egg will rest stably on the pair of concave rolls 18 and 21'.

Upon unloading of the egg, each pair of concave rolls 18 and 21' returns to the solid line positions of FIG. 8 by inertia. In these positions the rolls are ready to receive the next egg in the loading region of the breaker conveyor.

It will be understood that not one but both of each pair of concave rolls could be each transversely split into two segments. Also, instead of resorting to inertia for holding the rolls in the solid line positions of FIG. 8 when they are not loaded, comparatively light springs could be employed for the same purpose.

Thus, according to the teachings of FIGS. 8 to 10, each pair of concave rolls of the transfer conveyor readily adapts himself to shell eggs of varying sizes. Consequently, regardless of their sizes or positions on the infeed conveyor, shell eggs can be stably loaded on the concave roll pairs, transported thereby, and unloaded therefrom onto the breaker assemblies. The waste of shell eggs through their falling and breaking during the loading on and unloading from the concave roll pairs is thus drastically reduced.

Figure 11:
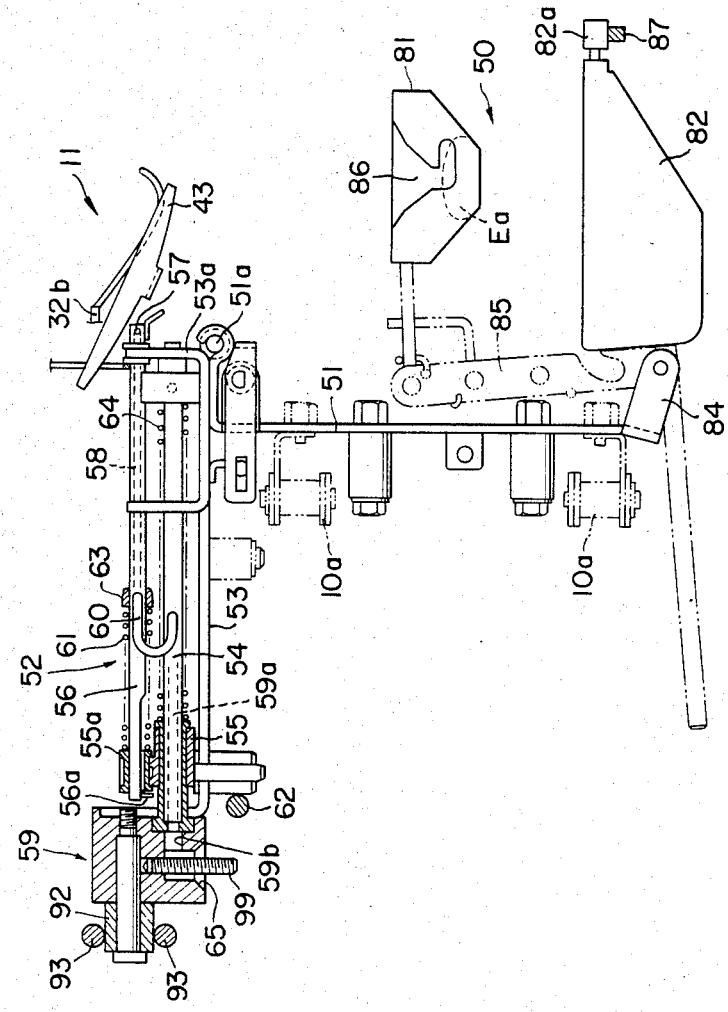
FIG. 11 is an enlarged elevation, partly sectioned for clarity, of one of the air nozzle assemblies and one of the recovery cup assemblies as mounted on the breaker conveyor in the egg breaker of FIG. 1.
Figure 12:
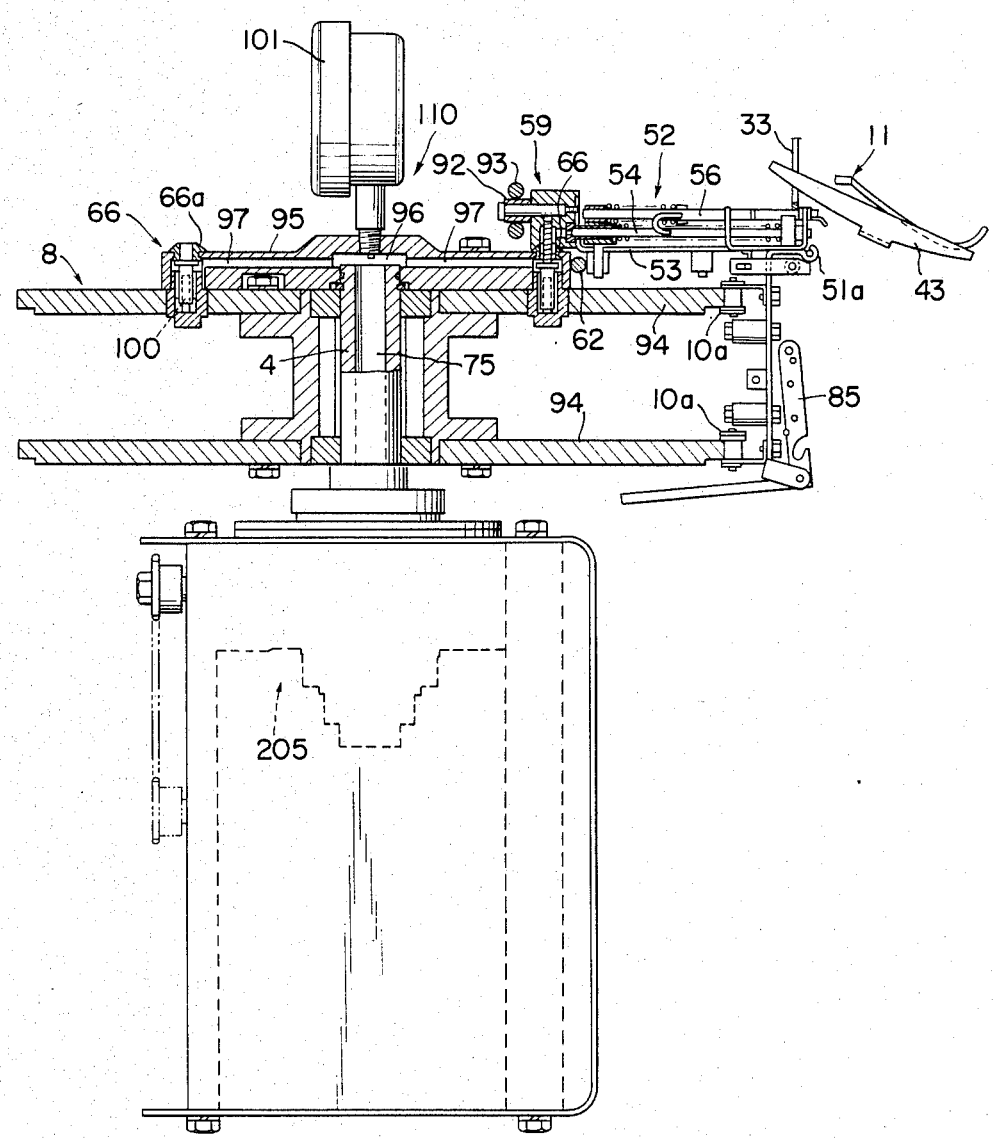
FIG. 12 is an enlarged vertical section through the air supply mechanism in the egg breaker of FIG. 1, shown together with the air nozzle assembly of FIG. 11.

FIGS. 11 to 15 are detailed representations of the aforesaid means for pneumatically removing or recovering the residual liquid from within the broken egg shells on the breaker assemblies 11 in the residue removal region C of the breaker conveyor 10. The residue removal means comprise an air nozzle assembly 52, FIGS. 11 and 12, provided for each egg breaker assembly 11, and an air supply mechanism 110, FIGS. 12 to 14, on the idler wheel 8 of the breaker conveyor 10 for the delivery of pressurized air to the successive air nozzle assemblies 52 as they travel with the broken egg shells through the residue removal region C around the idler wheel 8.

FIG. 11 also shows a recovery cup assembly 50 under each egg breaker assembly 11. Operatively mounted on the pair of vertically spaced endless chains 10a of the breaker conveyor 10, each associated group of egg breaker assembly 11, air nozzle assembly 52 and recovery cup assembly 50 travels together through the successive processing regions A, B, C, D and F of FIG. 1.

With reference to FIG. 11 in particular, a support 51 is attached to the outside of the pair of endless chains 10a of the breaker conveyor for carrying each group of egg breaker assembly 11, recovery cup assembly 50 and air nozzle assembly 52. A mount 53 overlies each support 51 for pivotal motion about an axis at 51a. As will be seen also from FIG. 12, this axis extends approximately tangent to the idler wheel 8 when the pair of breaker conveyor chains are traveling in engagement with the pair of concentric discs 94 of the idler wheel driven by a driving means 205 (FIG. 12). The pivotal mount 53 supports one air nozzle assembly 52 and one egg breaker assembly 11 thereon.

The representative air nozzle assembly 52 of FIG. 11 includes a guide rod 54 immovably supported on the pivotal mount 53 so as to extend radially of the idler wheel 8 when the breaker conveyor chains 10a are traveling around the same. Extending parallel to the guide rod 54 is an elongate air nozzle 56 supported at its front or right hand end by an upstanding portion 53a of the pivotal mount 53 for longitudinal sliding motion therethrough. The rear end of the air nozzle 56, on the other hand, is slidably received in a sleeve 55a rigidly connected to a slide 55 slidably fitted over the guide rod 54. A pin 56a on the air nozzle 56 prevents the detachment of the sleeve 55a from over the air nozzle 56. Sleeved upon the air nozzle 56, a compression spring 61 acts between the sleeve 55a and a collar 63 fixedly mounted on the air nozzle, normally holding the sleeve on the rear end of the air nozzle.

Another compression spring 64 around the guide rod 54 extends between mount portion 53a and slide 55, holding the latter in abutment against a cam rail 62 on a stationary part, not shown, of the egg breaker. The cam rail 62 is contoured to cause the movement of the slide 55 back and forth along the guide rod 54.

Normally, or when the air nozzle assembly 52 is not in the residue removal region C of FIG. 1, the cam rail 62 holds the slide 55 in the position of FIG. 11 under the bias of the compression spring 64. The sleeve 55a connected to the slide 55 holds the air nozzle 56 in a retracted position as shown in FIG. 11. When the air nozzle assembly 52 comes to the residue removal region, the cam rail 62 causes the slide 55 to travel forwardly along the guide rod 54 against the bias of the compression spring 64. Moving with the slide 55, the sleeve 55a acts on the air nozzle 56 via the compression spring 61 thereby thrusting the air nozzle forwardly of the mount 53 to an extended working position.

As shown in both FIGS. 11 and 12, the egg breaker assembly 11 is mounted over the air nozzle assembly 52, with its egg rest disposed forwardly of the air nozzle assembly. The air nozzle 56 on extension has its front end positioned between the broken egg shells Eb, FIG. 15, being carried by the egg breaker assembly 11. It will also be noted from FIG. 15 that the air nozzle 56 has a pair of air outlet ports 57 on opposite sides of its front end portion. These outlet ports are oriented slightly upwardly for directing air under pressure into the deepest parts of the broken egg shells Eb.

With reference again to FIG. 11, the air nozzle 56 has an air passageway 58 formed axially therein for communicating the pair of air outlets 57 with a flexible conduit 60 leading to an air passageway 59a in the guide rod 54. The air passageway 59a communicates with an outlet port 59b in a coupling 59 rigidly mounted on the rear end of the pivotal mount 53. The coupling 59 has a downwardly open, countersunk inlet port 65 for placing the air nozzle 56 in and out of communication with the air supply mechanism 110, FIGS. 12 to 14, in a manner yet to be described. A valve actuator rod 99, embedded in the coupling 59, projects out of the inlet port 65.

A cam follower 92 projects rearwardly from the coupling 59 and is movably caught between a pair of cam rails 93. These cam means coact to cause the pivotal motion of the mount 53, together with the egg breaker assembly 11 and air nozzle assembly 52 thereon, about the horizontal axis at 51a. This pivotal motion of the mount 53 is necessary for the desired mechanical connection and disconnection of the coupling 59 to and from the air supply mechanism 110.

Figure 13:
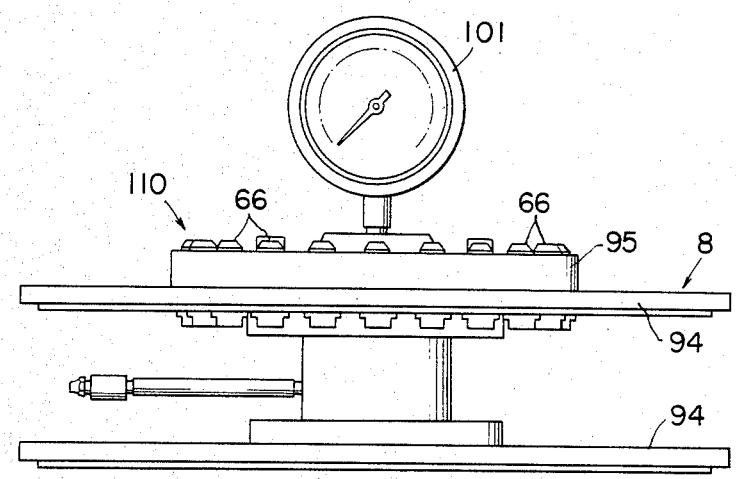
FIG. 13 is an elevation of the air supply mechanism of FIG. 12.
Figure 14:
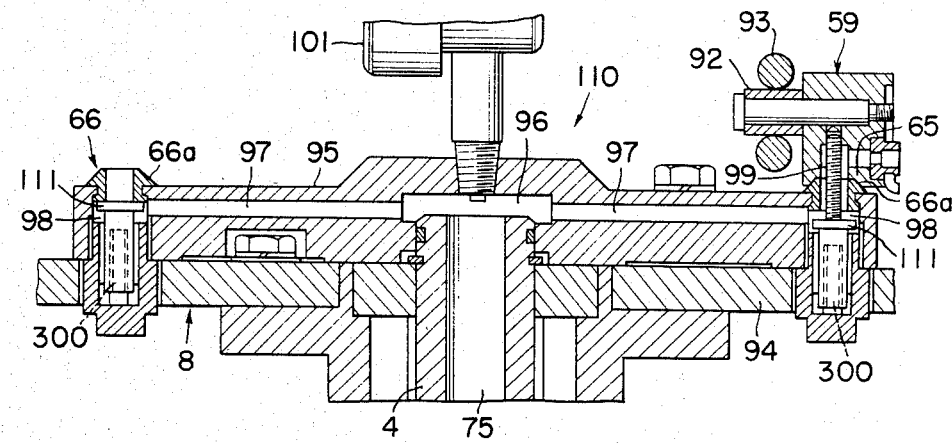
FIG. 14 is an enlarged vertical section through the air supply mechanism of FIGS. 12 and 13.

Reference is now directed to FIGS. 12 to 14 in order to describe the air supply mechanism 110 in detail. The air supply mechanism includes the idler wheel 8 having the pair of discs 94 rigidly mounted on the upstanding rotary shaft 4 for engagement with the respective endless chains 10a of the breaker conveyor. The idler wheel shaft 4 has an air passageway 75 formed axially therethrough for communication with a source of air under pressure.

Airtightly mounted on the idler wheel 8 is a disclike air distributor 95 which is concentric with the idler wheel and which has a diameter less than that of the idler wheel. The air distributor 95 has a plenum chamber 96 formed centrally therein in constant communication with the air passageway 75 in the idler wheel shaft 4. A plurality of branch passageways 97 extend radially outwardly from the plenum chamber 96 and terminate just short of the periphery of the air distributor 95. At the outer ends of the branch passageways 97 there are valve chambers 98, FIG. 14, housing valve members 111 and opening upwardly. Air-tightly engaged in the upward openings of the valve chambers are hollow male couplings 66 of annular arrangement for selective mating engagement with the coupling 59 of each air nozzle assembly 52. The coupling 59 of each air nozzle assembly will hereinafter be referred to as the female coupling in contradistinction to the male couplings 66 of the air supply mechanism 110. Each male coupling 66 has a frustoconical portion 66a projecting upwardly of the air distributor 95 to fit in the countersunk inlet port 65 of the female coupling 59.

Movable up and down in each valve chamber 98, the valve member 111 is biased upwardly by a spring 300 to normally butt on the bottom of the male coupling 66 and hence to close the air outlet therein. Upon engagement of the female coupling 59 of each air nozzle assembly 52 with any one male coupling 66 of the air supply mechanism 110 as in FIGS. 12 and 14, the valve actuator rod 99 depresses the valve member 111 against the force of the spring 300, thereby causing the flow of pressurized air from air supply mechanism to air nozzle assembly.

A pressure meter 101, FIGS. 12 to 14, is mounted on the air distributor 95 in air communication with the plenum chamber 96. The pressure meter visually indicates the pressure of the air being delivered from air supply mechanism 110 to successive air nozzle assemblies 52.

Each recovery cup assembly 50 is shown in FIG. 11 as comprising a yolk cup 81 and an albumen cup 82 for separately recovering the yolk and white of an egg as it is broken by the overlying breaker assembly 11. The yolk cup 81 receives both yolk and white from the broken egg and causes only the white to flow out of a recess 86 down into the underlying albumen cup 82. Some preferred forms of the yolk cup in accordance with the invention will be disclosed later.

Both yolk cup 81 and albumen cup 82 are mounted on the support 51 via links 84 and 85 for joint pivotal motion about a horizontal axis. The albumen cup 82 has a cam follower 82a projecting forwardly therefrom to rest on a cam rail 87 extending along the path of the breaker conveyor 10. The cam rail 87 causes the recovery cup assembly 50 to tilt forwardly for the discharge of the recovered yolk and white onto respective chutes or receptacles in the region between the wheels 9 and 7 (FIG. 1). After this discharge, the recovery cup assembly 50 is washed for the next process by a proper means (not shown).

The following is the description of operation of the air nozzle assemblies 52 and air supply mechanism 110 constructed as in FIGS. 11 to 14. As each air nozzle assembly 52 approaches or enters the residue removal region C, FIG. 1, around the idler wheel 8, the cam rail causes the slide 55 to travel forwardly along the guide rod 54 against the bias of the compression spring 64. The sleeve 55a travels forwardly with the slide 55 and so acts on the compression spring 61 to cause the forward movement of the air nozzle 56 therethrough. The forward travel of the air nozzle 56 terminates when its front end becomes positioned between the two fractured pieces of the eggshell Eb being carried by the breaker assembly 11 associated with the air nozzle assembly 52.

Possibly the shell egg on the breaker assembly may have not been broken in the recovery region B for some reason or other. Then the air nozzle 56 on movement toward its working positon will hit the shell egg but will not thrust into it because then the compression spring 61 will yield to prevent the continued forward travel of the air nozzle despite the full forward movement of the slide 55 with the sleeve 55a.

Immediately after the travel of the air nozzle 56 to its working position, or when the air nozzle assembly 52 enters the residue removal region C, the pair of cam rails 93 at its rear end causes the pivotal mount 53 to pivot counterclockwise, as viewed in FIGS. 11, 12 and 14, until the female coupling 59 of the air nozzle assembly becomes engaged with one of the male couplings 66 of the air supply mechanism 110 on the idler wheel 8. As the frustoconical portion 66a of the male coupling airtightly fits in the countersunk inlet port 65 of the female coupling 59, the valve actuator rod 99 projecting downwardly from the latter depresses the valve member 111 against the bias of the spring 300. Thereupon air under pressure flows from passageway 75 in the idler wheel shaft 4 to air nozzle 56 via plenum chamber 96, one of the branch passageways 97, one of the valve chambers 98, one of the male couplings 66, female coupling 59, passageway 59a in the guide rod 54, and flexible conduit 60.

Figure 15:
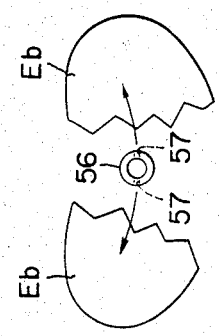
FIG. 15 is a view explanatory of the way in which the residual liquid is pneumatically recovered from within each broken eggshell by the air nozzle assembly of FIG. 11 in coaction with the air supply mechanism of FIGS. 12 to 14.

The air nozzle 56 expels the pressurized air out of the two ports 57 formed in approximately diametrically opposite positions in its front end. As has been stated, these outlet ports are directed slightly upwardly, so that the air streams issuing therefrom are applied to the deepest parts of the broken eggshell pieces Eb on the breaker assembly 11, as illustrated in FIG. 15.

Ideally, all the contents of the eggs are recovered from the broken shells in the recovery region B. However, depending upon the way each shell egg is cut and fractured, a part of the white or a fraction of the yolk that has been severed by the breaker knife assembly may remain in the broken eggshell. All such residual liquid is blown out of the eggshell fragments by the forced streams of air from the air nozzle 56, falling into the yolk cup 81. The white will overflow from the yolk cup 81 through its recess 86 and fall further down into the albumen cup 82.

The same residue recovery operation is performed for the successive combinations of egg breaker assemblies 11, recovery cup assemblies 50, and air nozzle assemblies 52 as they travel with the breaker conveyor 10 through the residue removal region C around the idler wheel 8.

About the moment when each group of egg breaker assembly, recovery cup assembly and air nozzle assembly leaves the residue removal region C, the pair of cam rails 93 lifts the pivotal mount 53 about its axis 51a thereby causing disengagement of the female coupling 59 from one of the male couplings 66 on the idler wheel 8. The group of three assemblies in question can now travel away from the idler wheel 8. Upon disengagement from the female coupling 59, the male coupling 66 has its air outlet reclosed by the valve member 111 under the bias of the spring 300. The cam rail 62 causes the slide 55 to travel rearwardly along the guide rod 54 under the effect of the compression spring 64 and thus allows the air nozzle 56 to return to the illustrated retracted position.

It will be appreciated that the residue removal means set forth in the foregoing are well calculated to make possible the complete recovery of the liquid from each broken egg, with provisions for preventing the air nozzle from thrusting into an unbroken shell egg and so wasting it. Particular attention is called to the fact that the air supply mechanism 110 is built into the idler wheel 8 and cooperates with the air nozzle assemblies 52 traveling with the respective egg breaker assemblies 11 on the breaker conveyor 10. Thus the residue removal means require no particular installation space but can efficiently remove the residual liquid from within the broken eggshells on the running breaker conveyor. As an additional advantage, the air nozzle assemblies can be exactly positioned in relation to the air supply mechanism as the former are mounted on the breaker conveyor chains running in engagement with the idler wheel incorporating the air supply mechanism.

As has been stated in connection with FIG. 1, the broken eggshells as well as unbroken shell eggs are unloaded from the breaker assemblies 11 in the discharge region F around the idler wheel 7. The nozzle assemblies 52 may be used, without the aid of the air supply mechanism 110, for the unloading of the broken eggshells and unbroken shell eggs from the breaker assemblies in the discharge region.

Figure 16:
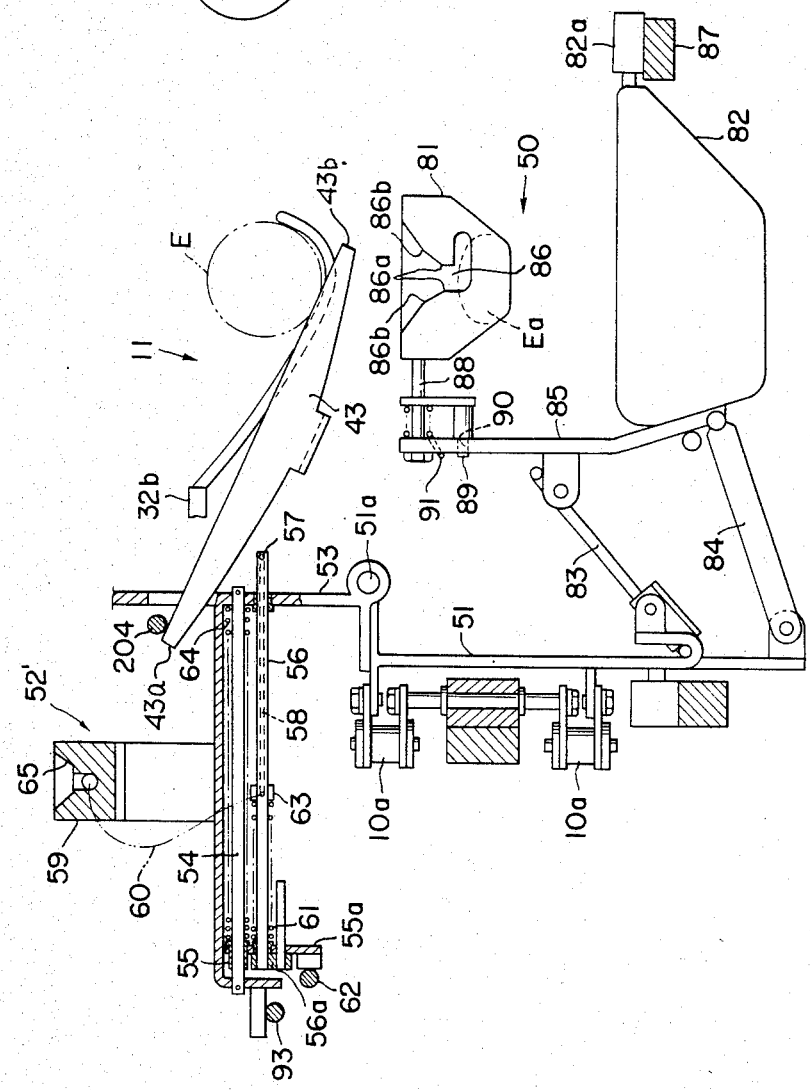
FIG. 16 is a view similar to FIG. 11 but showing a modified air nozzle assembly together with an associated recovery cup assembly.
Figure 17:
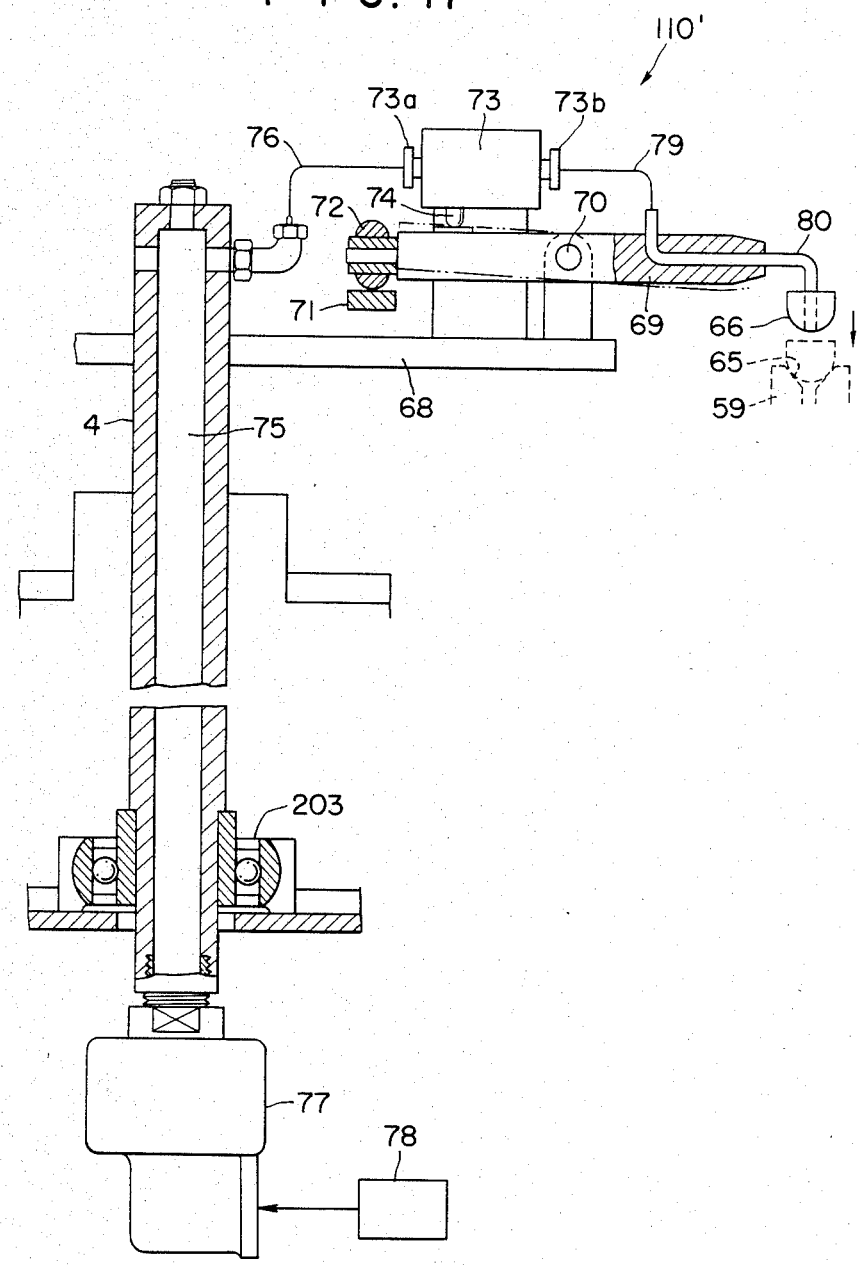
FIG. 17 is a fragmentary vertical section through a modified air supply mechanism for use with the air nozzle assembly of FIG. 16.

FIG. 16 shows a modified air nozzle assembly 52′, for combined use with a correspondingly modified air supply mechanism 110′ of FIG. 17. As in the preceding embodiment, the air nozzle assembly 52′ is provided, together with the associated one of the egg breaker assemblies 11, on a mount 53 pivoted at 51a on a support 51 carried by the pair of endless chains 10a of the breaker conveyor. The recovery cup assembly 50 is also carried by the support 51 under the egg breaker assembly 11.

The modified air nozzle assembly 52′ is analogous in construction to the air nozzle assembly 52 of FIGS. 11 and 12 except for the arrangement of its constituent parts. Included is a guide rod 54 fixedly mounted on the pivotal mount 53 so as to extend normally to the pair of breaker conveyor chains 10a, or radially of the idler wheel 8 when the breaker conveyor chains are traveling around the same. A slide 55 is slidably mounted on the guide rod 54 and is normally held in the illustrated position on the rear end of the guide rod by a compression spring 64.

Arranged parallel to the guide rod 54 and disposed thereunder, an elongate air nozzle 56 is slidably supported at its opposite ends by the pivotal mount 53 and by a member 55a substantially integral with the slide 55 on the guide rod 54. A compression spring 61 around the air nozzle 56 extends between the member 55a and a collar 63 on the air nozzle to transmit the motion of the slide 55 to the air nozzle therethrough. A rear end enlargement 56a of the air nozzle 56 prevents its detachment from the member 55a.

In sliding engagement with the member 55a integral with the slide 55 is a cam rail 62 for causing the travel of the slide back and forth along the guide rod 54. Upon forward or rightward travel of the slide 55 against the force of the compression spring 64, the member 55a acts on the other compression spring 61 thereby causing the air nozzle 56 to travel in the same direction toward the egg breaker assembly 11. The cam rail 62 normally holds the air nozzle 56 in the illustrated position.

The air nozzle 56 has a pair of air outlet ports 57 formed in approximately diametrically opposite positions in the adjacency of its front end, as in FIG. 15. Also as in the preceding embodiment, these air outlet ports are oriented slightly upwardly for directing the streams of pressurized air into the deepest parts of the broken eggshells Eb on the breaker assembly 11.

The pair of air outlet ports 57 of the air nozzle 56 communicate via a passageway 58 therein with a flexible conduit 60 leading to a female coupling 59 rigidly mounted atop the pivotal mount 53. The female coupling 59 has an upwardly open, countersunk inlet port 65 for placing the air nozzle 56 in and out of communication with the air supply mechanism 110′ of FIG. 17.

Although the air nozzle assembly 52′ is pivotable with the mount 53 about the axis 51a as in the FIGS. 11 to 14 embodiment, the pivoting of the air nozzle assembly 52′ is intended to make possible the optimum positioning of the front end of the air nozzle 56 between the broken eggshell pieces on the breaker assembly 11. The necessary motion for the connection and disconnection of the air nozzle assembly to and from the air supply mechanism 110′ is performed on the side of the air supply mechanism, as will be understood from the following description of FIG. 17.

The air supply mechanism 110′ comprises a plurality of pivotal arms 69 on respective brackets 68 extending radially from the upstanding shaft 4 of the idler wheel 8. The single pivotal arm 69 seen in FIG. 17 is typical of all such arms bracketed to the idler wheel shaft 4. The representative arm 69 is medially pivoted at 70 on one bracket 68, for pivotal motion about the horizontal axis 70, and generally extends radially of the idler wheel shaft 4.

Projecting from the outer end of the pivotal arm 69 is a conduit 80 which is bent downwardly to terminate in a male coupling 66 for delivering pressurized air to the air nozzle assembly 52′. The male coupling 66 is movable into and out of airtight engagement with the female coupling 59 of the air nozzle assembly 52′ with the pivotal motion of the arm 69 about the axis 70. Preferably the conduit 80 has some resiliency so that the male coupling 66 may fit closely in the countersunk inlet port 65 of the female coupling 59 with a minimum of shock.

It will now be seen that the illustrated and other pivotal arms 69 together with the male couplings 66 are arranged at constant angular spacings about the idler wheel shaft 4. The angular spacings therebetween correspond to the angular spacings between the air nozzle assemblies 52′ on the breaker conveyor chains 10a traveling around the idler wheel 8. Thus the male couplings 66 of the air supply mechanism 110′ can be moved into and out of engagement with the female couplings 59 of the successive air nozzle assemblies 52′ with the pivotal motion of the arms 69 in a controlled sequence.

Adapted for such controlled pivotal motion of the arms 69 is a cam rail 71 immovably supported around the idler wheel shaft 4 for engagement with a cam follower 72 rotatably mounted on the inner end of each arm 69. When pivoted from the solid-line to phantom position in FIG. 17, each arm 69 has its male coupling 66 engaged in the female coupling 59 of one of the air nozzle assemblies 52'.

The conduit 80 carrying each male coupling 66 communicates by way of a conduit 79 with the outlet port 73b of an on-off valve 73 fixedly mounted on each bracket 68. The inlet port 73a of this on-off valve communicates by way of a conduit 76 with the air passageway 75 formed axially in the idler wheel shaft 4. The passageway 75 communicates with a source 78 of air under pressure via a rotary valve 77 at the bottom end of the idler wheel shaft 4 rotatably supported by a bearing 203.

Normally held closed, the on-off valve 73 must be opened when the male coupling 66 is in engagement with the female coupling 59 of the air nozzle assembly 52' in the residue removal region C. To this end the on-off valve 73 has a valve actuator 74 extending downwardly therefrom into abutment against the pivotal arm 69. Thus the on-off valve 73 is opened upon pivotal motion of the arm 69 to the phantom position by the effect of the cam rail 71.

The recovery cup assembly 50, FIG. 16, for use with each modified air nozzle assembly 52' can be similar in construction to the recovery cup assembly of FIG. 11, comprising the recessed yolk cup 81 immediately underlying the egg breaker assembly 11, and the larger albumen cup 82 below the yolk cup. Means for mounting these cups on the pair of breaker conveyor chains 10a, however, differ from those of FIG. 11.

The cup-mounting means of FIG. 16 include three pivoted links 83, 84 and 85 on the support 51 adapted to allow the tilting motion of the cups 81 and 82 as dictated by the cam rail 87 on which rests the cam follower 82a projecting from the free end of the albumen cup 82. Besides being pivotable with the albumen cup 82, the yolk cup 81 is tiltable about a pin 88 supporting the yolk cup on the link 85. The pin 88 extends horizontally in a direction normal to the breaker conveyor chains 10a, so that the yolk cup can be tilted toward its side where the recess 86 is formed. Parallel to the pin 88, another pin 89 is secured to the yolk cup 81 and engaged in an arcuate slot 90 in the link 85 in order to limit the angle through which the yolk cup is pivoted about the pin 88. Normally the yolk cup 81 is held horizontally by a torsion spring 91. The pin 89 is cam-operated to tilt the yolk cup 81 against the force of the spring 91 when the white and yolk drops from the broken shell egg being carried by the overlying breaker assembly 11. Such tilting of the yolk cup 81 is of course intended to expedite the outflow of the white through the recess 86.

In the operation of each air nozzle assembly 52' of FIG. 16 and the air supply mechanism 110' of FIG. 17, the cam rail 62 causes the slide 55 of the air nozzle assembly to travel forwardly along the guide rod 54 against the force of the compression spring 64. Traveling with the slide 55, the member 55a acts on the air nozzle 56 via the compression spring 61 thereby causing the air nozzle to move to its working position where its front end lies between the severed fragments of the eggshell Eb on the breaker assembly 11 as in FIG. 15. If the shell egg has not been broken in the recovery region B, the compression spring 61 will yield when the air nozzle 56 hits the shell egg, as in the air nozzle assembly of FIGS. 11 and 12.

Also, when the air nozzle assembly 52' in question enters the residue removal region C, the cam rail 71 of the air supply mechanism 110' on the idler wheel 8 causes one of the arms 69 to pivot to the phantom position of FIG. 17. Thereupon the male coupling 66 carried by this pivoted arm 69 airtightly fits in the countersunk inlet port 65 of the female coupling 59 of the air nozzle assembly 52'.

The pivotal motion of the arm 69 also results in the activation of the valve actuator 74 of the on-off valve 73. With the on-off valve thus opened, the pressurized air flows from its source 78 to the male coupling 66 by way of the rotary valve 77, passageway 75 in the idler wheel shaft 4, conduit 76, on-off valve 73, and conduits 79 and 80. The pressurized air flows from the male coupling 66 into the female coupling 59 and thence into the air nozzle 56 of the air nozzle assembly 52' by way of the flexible conduit 60.

The manner in which the pressurized air is expelled from the air nozzle 56 into the broken eggshell on the breaker assembly 11 for the removal of the residual liquid therefrom is as set forth above in connection with FIGS. 11 to 15. The advantages gained by this modified air nozzle assemblies 52' and air supply mechanism 110' will also be apparent from the foregoing.

Figure 18:
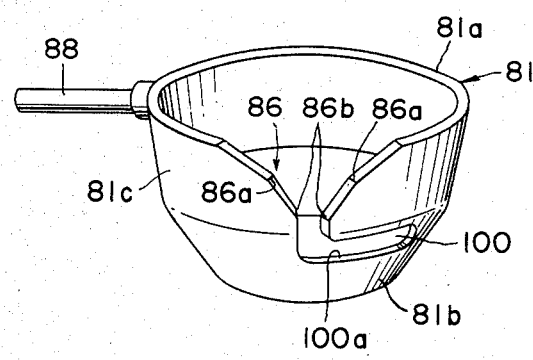
FIG. 18 is a perspective view of a yolk cup for use in the egg breaker of FIG. 1.
Figure 19:
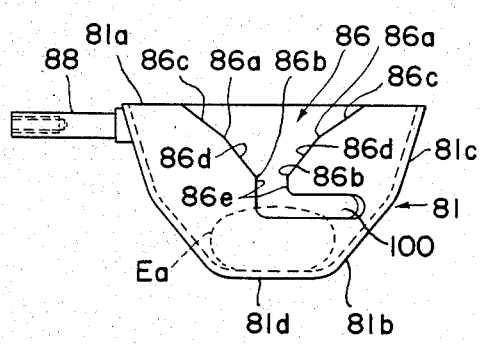
FIG. 19 is an elevation of the yolk cup of FIG. 18.

FIGS. 18 to 22 illustrate preferred forms of the yolk cup 81 seen in FIGS. 11 and 16. With particular reference to FIGS. 18 and 19, the exemplified yolk cup 81 has an upper portion 81c rather gently tapering downwardly, and a lower portion 81b tapering at a greater angle to a flat bottom 81d sized to allow the yolk Ea to rest neatly thereon.

The noted recess 86 extends downwardly from the top edge 81a of the yolk cup to a level slightly below the top of the egg yolk Ea to be received therein. This recess is defined by three pairs of opposed linear edges 86c, 86d and 86e as indicated in FIG. 19. The uppermost pair of edges 86c upwardly diverge apart at an angle of, for example, 90 degrees. The intermediate pair of edges 86d also upwardly diverge apart, but at a smaller angle. The lowermost pair of edges 86e are parallel to each other. In short the edges bounding the recess 86 diverge apart at progressively greater angles as they extend upwardly, thereby providing two pairs of angles 86a and 86b. This shape of the recess 86 is intended to facilitate the separation of the egg white in the initial stage of its outflow, as will be later explained in further detail.

Extending circumferentially from the lower end of the recess 86 is a slot 100 having a length approximately one sixth the cup circumference for the best results. As shown in an enlarged vertical section in FIG. 22, the slot 100 lies in the tapering lower portion 81b of the yolk cup, with its lower edge 100a disposed slightly below the top of the yolk Ea on the bottom of the cup.

Figure 20A:
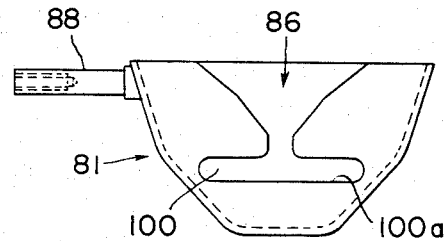
FIG. 20A is an elevation of a slight modification of the yolk cup of FIGS. 18 and 19.
Figure 20B:
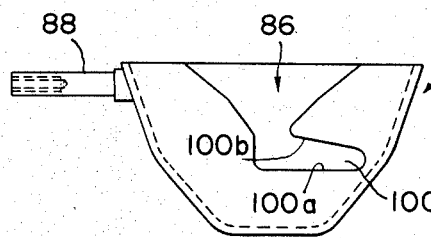
FIG. 20B is an elevation of another modification of the yolk cup.
Figure 20C:
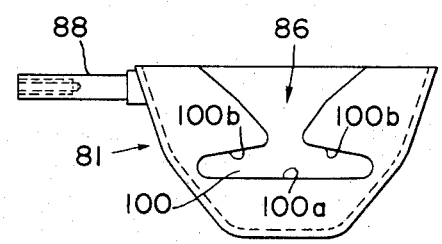
FIG. 20C is an elevation of still another modification of the yolk cup.
Figure 21:
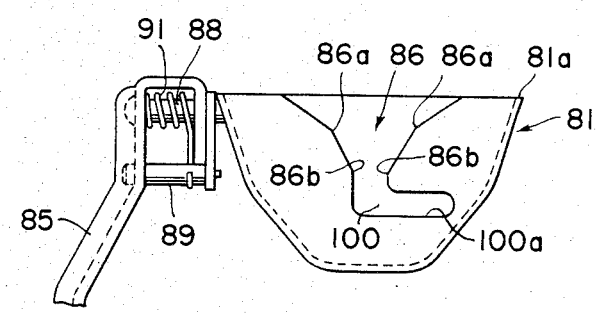
FIG. 21 is an elevation of the yolk cup of FIGS. 18 and 19 shown together with its supporting means.
Figure 22:
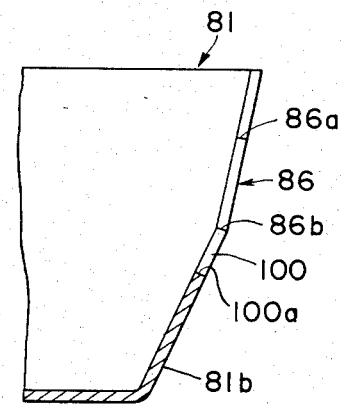
FIG. 22 is an enlarged, fragmentary vertical section through the yolk cup of FIGS. 18, 19 and 21.

In the yolk cup 81 shown in FIGS. 18, 19 and 21, the slot 100 extends in the direction in which the cup is tilted for the discharge of the yolk therefrom. Alternatively, as depicted in FIG. 20A, the slot 100 may extend in opposite circumferential directions from the lower end of the recess 86 to the same extent. Further the slot 100 need not be of constant width as in the two examples disclosed above. Thus, in the additional example given in FIG. 20B, the slot 100 extending in one circumferential direction from the lower end of the recess 86 has an upper edge 100b sloping downwardly as it extends away from the recess 86. FIG. 20C illustrates a further example wherein the slot 100 extending in opposite circumferential directions from the lower end of the recess 86 has upper edges 100b sloping downwardly as they extend away from the recess.

As a shell egg is broken and severed by each breaker assembly in the above described manner, its contents fall into the underlying yolk cup 81. Having a greater specific gravity than the white, the yolk seats directly on the flat bottom 81d of the yolk cup 81, with the white overlying it.

The white of an egg consists of an outer body of fluid albumen and an inner mass of dense albumen. The fluid albumen encloses the dense albumen, which in turn surrounds the yolk. The fluid albumen first flows out of the divergent recess 86 in the yolk cup 81, followed by the escape of the dense albumen through the horizontal slot 100. In thus escaping out of the slot 100, the dense albumen will first hang from the cup, throughout the slot, but then will be cut off by its elongate lower edge 100a.

As has been mentioned in conjunction with FIG. 16, the yolk cup 81 can be tilted or oscillated about its supporting pin 88 by the cam-operated pin 89 between the horizontal position and a tilted position where its recessed side is lowered. The repeated tilting of the yolk cup is especially effective for fresh eggs whose white and yolk stick firmly together. The fluid albumen of a fresh egg will protrude from the divergent recess 86 upon initial tilting of the yolk cup 81. During the subsequent return of the yolk cup to the horizontal position, the divergent recess 86 with its angles 86a and 86b will hamper the inflow of the fluid albumen back into the cup. The dense albumen, on the other hand, will hang out of the horizontally elongated slot 100 in the form of a flat, thin body upon tilting of the yolk cup. Thus, by the repeated tilting of the yolk cup, the white will separate from the yolk and drop into the albumen cup 82 of FIG. 11 or 16.

Upon completion of the repeated tilting of the yolk cup 81 by the unshown cam with the lapse of a preassigned length of time, the yolk cup will return to the horizontal position by the effect of the torsion spring 91. Then, in the predetermined region between the regions D and F along the breaker conveyor 10, FIG. 1, the yolk cup 81 is tilted forwardly, or toward the right as viewed in FIGS. 18 to 21, thereby causing the recovered yolk to flow out over its brim 81a.

The foregoing will have made clear that the various examples of the yolk cup in accordance with the invention are well calculated to realize the ready and positive separation of the white and yolk regardless of whether the eggs being processed are fresh or not. Thus, despite the high speed processing of eggs for which the invention is intended, the recovered yolk will be nearly completely free from the white.

It should also be noted that the recess 86 with the slot 100 is situated on the trailing side of each yolk cup with respect to its traveling direction on the breaker conveyor. Thus positioned, the recess presents no possibility of breaking the membrane enveloping the yolk during its discharge from the tilted yolk cup. The breaking of the vitellin membrane is objectionable since the yolk will then become loose and spread over the cup and other parts, necessitating their cleaning.

The fact that the slot 100 in each yolk cup extends from the lower end of the recess 86 in a direction away from the breaker conveyor chains is also an important factor for the efficient separation of the white and yolk. As the breaker conveyor turns around one of the idler wheels, the dense albumen protruding from the slot 100 will be centrifugally thrown away from the cup and so will separate from the yolk.

Furthermore, as shown in FIG. 2, the drive roll 18a is made of rubber and is rotated by a belt 300a. It extends through a predetermined length. The drive roll 18a does not extend to a position P1 where each shell egg is transferred from the infeed conveyor 13 to the transfer conveyor 11. However, the right end of the roll 18a extends to a position P2 where the egg shell are transferred from the transfer conveyor 11 to the breaker assembly as shown in FIG. 5. Each shell egg is rotated around its axis in a direction where it is easily moved toward the breaker assembly (counterclockwise direction as viewed in FIG. 5), whereby the shell egg is smoothly transferred from the transfer conveyor 12 to the breaker assembly 11 when the concave rolls 21 reach the most elevated position H. The drive roll 18a tapers at its left end 18b, as viewed in FIG. 2, so that each concave roll 18 can come into smooth contact with the drive roll 18a.

While the present invention has been shown and described in terms of but one embodiment and modifications thereof, it is recognized that departures may be made therefrom within the scope of the invention, which is not to be limited to the details disclosed herein but is to be accorded the full scope of the claims so as to embrace any and all equivalent processes and devices.

What is claimed is:

1. A high-speed egg-breaking apparatus comprising:
   (a) an infeed conveyor for transporting a multiplicity of shell eggs in transverse rows;
   (b) a transfer conveyor for receiving the shell eggs from the infeed conveyor, the transfer conveyor being arranged at a right angle with the infeed conveyor, whereby the successive transverse rows of shell eggs on the infeed conveyor can be rearranged into a longitudinal row on the transfer conveyor;
   (c) a breaker conveyor traveling endlessly along a predetermined path including a linear portion extending along the transfer conveyor, the transfer conveyor being linearly arranged along the forward end of the infeed conveyor and the linear portion of the breaker conveyor, the transfer conveyor and the linear portion of the breaker conveyor being moved in the same direction and at the same speed;
   (d) a plurality of egg breaker assemblies carried at longitudinal spacings by the breaker conveyor for receiving the shell eggs from the transfer conveyor while traveling along the same and for breaking the received shell eggs; and
   (e) a plurality of recovery cup assemblies also carried by the breaker conveyor and underlying the respective egg breaker assemblies for receiving the white and yolk from the broken shell eggs.

2. The high-speed egg-breaking apparatus according to claim 1, wherein the breaker conveyor forms an endless path having at least four corners by a plurality of wheels located respectively in the corners, the endless path having a loading region, extending along the transfer conveyor, where shell eggs are loaded on the individual breaker assemblies from the infeed conveyor via the transfer conveyor, a recovery region located adjacent to the loading region, where the shell eggs are broken and their yolk and white are recovered, a residue removal region, extending arcuately along a corner located downstream of the recovery region, where the residual liquid in the broken eggs are pneumatically removed therefrom and recovered, an inspection region located downstream of the residue removal region, where the recovered egg contents are examined, and a discharge region, located between the loading region and the inspection region, and where the broken egg shells as well as unbroken shell eggs, if any, are discharged from the breaker assemblies.

3. The high-speed egg-breaking apparatus according to claim 1, wherein the transfer conveyor has a plurality of pairs of parallel concave rolls rotatably mounted thereon at longitudinal spacings equal to the spacings between the egg breaker assemblies on the breaker conveyor, each pair of concave rolls being adapted to receive one shell egg from the infeed conveyor and to transfer the shell egg onto one of the egg breaker assemblies.

4. The high-speed egg-breaking apparatus according to claim 3, wherein the concave rolls are arranged with their axes oriented longitudinally of the transfer conveyor, and wherein the transfer conveyor further comprises:
   (a) means for individually supporting the concave rolls on one side of the transfer conveyor for up-and-down motion relative to the concave rolls on the other side of the transfer conveyor; and
   (b) means for individually moving the concave rolls on one side of the transfer conveyor up and down relative to the concave rolls on the other side of the transfer conveyor depending upon the positions of the concave rolls on the transfer conveyor;
   (c) whereby each pair of concave rolls are tiltable toward the infeed conveyor for receiving a shell egg therefrom and toward one of the egg breaker assemblies for transferring the shell egg onto the same.

5. The high-speed egg-breaking apparatus according to claim 3, wherein the concave rolls on the transfer conveyor are each slidable axially within limits relative to the transfer conveyor, and wherein at least either of each pair of concave rolls is transversely split into two segments, whereby each pair of concave rolls accommodate themselves to the size of a shell egg loaded thereon for steadily supporting the same.

6. The high-speed egg-breaking apparatus according to claim 3, further comprising means for imparting rotation to one of each pair of concave rolls in a direction where the shellegg on each pair of the concave rolls can be moved as rotating toward each breaker assembly, said means extending to a position where the shellegg is transferred from the concave rolls to one of breaker assemblies.

7. The high-speed egg-breaking apparatus according to claim 1, further comprising residue removal means for pneumatically recovering the residual liquid from within the broken eggshells being carried by the egg breaker assemblies on the breaker conveyor.

8. The high-speed egg-breaking apparatus according to claim 1, wherein each recovery cup assembly comprises:
   (a) a yolk cup immediately underlying one of the egg breaker assemblies for receiving the white and yolk from the broken egg thereon, the yolk cup being adapted to cause only the white to flow out of the same; and
   (b) an albumen cup underlying the yolk cup for receiving the white therefrom.

9. The high-speed egg-breaking apparatus according to claim 8, wherein the yolk cup of each recovery cup assembly has formed therein a recess extending downwardly from its top edge and terminating short of its bottom, and a slot extending at least in one circumferential direction from the lower end of the recess.

10. The high-speed egg-breaking apparatus according to claim 8, wherein the yolk cup of each recovery cup assembly has a lower portion tapering to the bottom which is sized to allow the yolk to rest relatively neatly thereon, and wherein the lower end of the recess is somewhat below the top of the yolk resting on the bottom.

11. The high-speed egg-breaking apparatus according to claim 9, wherein the recess in the yolk cup is bounded by opposed edges diverging apart at progressively greater angles as they extend upwardly.

12. The high-speed egg-breaking apparatus according to claim 9, wherein the recess is located on the trailing side of each yolk cup with respect to its predetermined traveling direction with the breaker conveyor, and wherein the slot extends from the lower end of the recess in a direction away from the breaker conveyor.

13. A high-speed egg-breaking apparatus comprising:
   (a) an infeed conveyor for transporting a multiplicity of shell eggs in transverse rows;
   (b) a transfer conveyor for receiving the shell eggs from the infeed conveyor, the transfer conveyor being arranged at a right angle with the infeed conveyor, whereby the successive transverse rows of shell eggs on the infeed conveyor can be rearranged into a longitudinal row on the transfer conveyor;
   (c) a breaker conveyor traveling endlessly along a predetermined path including a portion extending along the transfer conveyor;
   (d) a plurality of egg breaker assemblies carried at longitudinal spacings by the breaker conveyor for receiving the shell eggs from the transfer conveyor while traveling along the same and for breaking the received shell eggs;
   (e) a plurality of recovery cup assemblies also carried by the breaker conveyor and underlying the respective egg breaker assemblies for receiving the white and yolk from the broken shell eggs; and
   (f) residue removal means for pneumatically recovering the residual liquid from within the broken egg shells being carried by the egg breaker assemblies on the breaker conveyor, said residue removal means comprising:
      (i) a plurality of air nozzle assemblies operatively mounted on the breaker conveyor in the vicinity of the respective egg breaker assemblies thereon, each air nozzle assembly including an air nozzle movable between a retracted and a working position, the air nozzle on movement to the working position being located between broken pieces of a egg shell on one of the egg breaker assemblies for directing streams of air under pressure into the deepest parts of the egg shell pieces, and
      (ii) an air supply mechanism for supplying air under pressure to air nozzle assemblies while the latter are traveling through a prescribed residual removal region along the path of the breaker conveyor.

14. The high-speed egg-breaking apparatus according to claim 13, wherein each air nozzle assembly of the residue removal means further comprises a spring through which the air nozzle is moved from the retracted to the working position, whereby if the corresponding one of the egg breaker assemblies carries an unbroken shell egg, the spring yields upon movement of the air nozzle from the retracted toward the working position, thereby preventing the air nozzle from thrusting into the unbroken shell egg.

15. The high-speed egg-breaking apparatus according to claim 13, wherein the breaker conveyor extends around a plurality of rotary wheels, and wherein the air supply mechanism of the residue removal means is incorporated in one of the rotary wheels, located downstream of a prescribed region where the shell eggs are transferred from the transfer conveyor onto the egg breaker assemblies on the breaker conveyor, for supplying air under pressure to the successive air nozzle assemblies while the latter are traveling around said one rotary wheel.

16. A high-speed egg-breaking apparatus comprising:
(a) an infeed conveyor for transporting a multiplicity of shell eggs in transverse rows;
(b) a transfer conveyor for receiving the shell eggs from the infeed conveyor, the transfer conveyor being arranged at a right angle with the infeed conveyor, whereby the successive transverse rows of shell eggs on the infeed conveyor can be rearranged into a longitudinal row on the transfer conveyor;
(c) a breaker conveyor traveling endlessly along a predetermined path including a first portion extending along the transfer conveyor and a second portion extending around a plurality of rotary wheels;
(d) a plurality of egg breaker assemblies carried at longitudinal spacings by the breaker conveyor for receiving the shell eggs from the transfer conveyor while traveling along the same and for breaking the received shell eggs;
(e) a plurality of recovery cup assemblies also carried by the breaker conveyor and underlying the respective egg breaker assemblies for receiving the white and yolk from the broken shell eggs; and
(f) residue removal means for pneumatically recovering the residual liquid from within the broken egg shells being carried by the egg breaker assemblies on the breaker conveyor, said residue removal means comprising:
(i) an air supply mechanisms comprising:
(A) a plurality of air outlet couplings arranged annularly on one of the rotary wheels which is located downstream of a prescribed region where the shell eggs are transferred from the transfer conveyor onto the egg breaker assemblies on the breaker conveyor;
(B) there being air passageways in said one rotary wheel through which air under pressure is supplied to the air outlet couplings; and
(C) a valve provided to each air outlet coupling for normally holding the same closed;
(ii) a plurality of air nozzle assemblies pivotably mounted on the breaker conveyor in the vicinities of the respective egg breaker assemblies thereon, each air nozzle assembly comprising:
(A) an air nozzle movable between a retracted and a working position, the air nozzle on movement to the working position being located between broken pieces of an egg shell on one of the egg breaker assemblies for directing streams of air under pressure into the deepest part of the egg shell pieces;
(B) means for moving the air nozzle between the retracted and working positions;
(C) an air inlet coupling communicating with the air nozzle and movable into and out of airtight engagement with one of the air outlet couplings of the air supply mechanism for the pivotable motion of the air nozzle assembly; and
(D) a valve actuator for opening the valve of one of the air outlet couplings of the air supply mechanism upon engagement of the air inlet coupling therewith; and
(iii) means for pivotably moving the air nozzle assemblies in such a way that the air inlet coupling of each air nozzle assembly is held in engagement with one of the air outlet couplings of the air supply mechanism while the air nozzle assembly is traveling through a prescribed residue removal region around said one of the rotary wheels, the air nozzle of each air nozzle assembly being held in the working position while the air nozzle assembly is traveling through the residue removal region.

17. The high-speed egg-breaking apparatus according to claim 16, wherein each air nozzle assembly of the residue removal means further comprises a spring through which the air nozzle is moved from the retracted to the working position by the moving means, whereby if the corresponding one of the egg breaker assemblies carries an unbroken shell egg, the spring yields upon movement of the air nozzle from the retracted toward the working position, thereby preventing the air nozzle from thrusting into the unbroken shell egg.

18. A high-speed egg-breaking apparatus comprising:
(a) an infeed conveyor for transporting a multiplicity of shell eggs in transverse rows;
(b) a transfer conveyor for receiving the shell eggs from the infeed conveyor, the transfer conveyor being arranged at a right angle with the infeed conveyor, whereby the successive transverse rows of shell eggs on the infeed conveyor can be rearranged into a longitudinal row on the transfer conveyor;
(c) a breaker conveyor traveling endlessly along a predetermined path including a first portion extending along the transfer conveyor and a second portion extending around a plurality of rotary wheels;
(d) a plurality of egg breaker assemblies carried at longitudinal spacings by the breaker conveyor for receiving the shell eggs from the transfer conveyor while traveling along the same and for breaking the received shell eggs;
(e) a plurality of recovery cup assemblies also carried by the breaker conveyor and underlying the respective egg breaker assemblies for receiving the white and yolk from the broken shell eggs; and
(f) residue removal means for pneumatically recovering the residual liquid from within the broken egg shells being carried by the egg breaker assemblies on the breaker conveyor, said residue removal means comprising:
(i) a plurality of air nozzle assemblies mounted on the breaker conveyor in the vicinities of the respective egg breaker assemblies thereon, each air nozzle assembly comprising:

(A) an air nozzle movable between a retracted and a working position, the air nozzle when in the working position being located between broken pieces of an egg shell on one of the egg breaker assemblies for directing streams of air under pressure into the deepest part of the egg shell pieces;

(B) means for moving the air nozzle between the retracted and working positions; and (C) an air inlet coupling in constant communication with the air nozzle;

(ii) an air supply mechanism for supplying air under pressure to the air nozzle assemblies while they are traveling through a prescribed residue removal region around one of the rotary wheels which is located downstream of a loading region where the shell eggs are transferred from the transfer conveyor onto the egg breaker assemblies on the breaker conveyor, said air supply mechanism comprising:

(A) a source of air under pressure;

(B) a plurality of pivotal arms mounted on said one of the rotary wheels in radial arrangement;

(C) a plurality of air outlet couplings carried by the respective pivotal arms for movement into and out of airtight engagement with the air inlet couplings of the air nozzle assemblies with the pivotal motion of the pivotal arms;

(D) a plurality of on-off valves each interposed between one of the air outlet couplings and the pressurized air source, each on-off valve being normally held closed and being adapted to be opened upon movement of the corresponding one of the air outlet couplings into engagement with one of the air inlet couplings of the air nozzle assemblies; and (E) means for pivotably moving the pivotal arms in such a way that the air inlet coupling of each air nozzle assembly is held in engagement with one of the air outlet couplings of the air supply mechanism while the air nozzle assembly is traveling through the residue removal region, the air nozzle of each air nozzle assembly being held in the working position while the air nozzle assembly is traveling through the residue removal region.

* * * * *